United States Patent
Joe et al.

(10) Patent No.: US 6,859,709 B2
(45) Date of Patent: Feb. 22, 2005

(54) ENHANCED RATIO CONTROL TO ESTABLISH CVT RATIO WITH EXCELLENT PRECISION

(75) Inventors: Shinichiro Joe, Kanagawa (JP); Taketoshi Kawabe, Yokohama (JP); Michel Mensler, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 243 days.

(21) Appl. No.: 10/309,040

(22) Filed: Dec. 4, 2002

(65) Prior Publication Data

US 2003/0105572 A1 Jun. 5, 2003

(30) Foreign Application Priority Data

Dec. 4, 2001 (JP) .......................... 2001-369913

(51) Int. Cl.$^7$ ........................... G06F 19/00; F16H 11/06
(52) U.S. Cl. ............................ 701/51; 701/52; 701/56; 477/37; 477/46; 475/216; 475/208
(58) Field of Search ............................ 701/51, 52, 55, 701/56; 477/37, 46; 475/2, 208, 216

(56) References Cited

U.S. PATENT DOCUMENTS

| | | | |
|---|---|---|---|
| 4,872,371 A | 10/1989 | Fellows | |
| 5,027,668 A | 7/1991 | Nakano | |
| 5,902,208 A | 5/1999 | Nakano | |
| 6,217,469 B1 | * 4/2001 | Sawada et al. | 474/28 |
| 6,287,232 B1 | * 9/2001 | Sakai et al. | 475/216 |
| 6,317,672 B1 | 11/2001 | Kuramoto et al. | |
| 6,351,700 B1 | 2/2002 | Muramoto et al. | |
| 2002/0028722 A1 | 3/2002 | Sakai et al. | |
| 2002/0028723 A1 | 3/2002 | Hirano et al. | |
| 2002/0062186 A1 | * 5/2002 | Abiru | 701/51 |
| 2002/0128113 A1 | 9/2002 | Tibbles | |
| 2002/0161503 A1 | 10/2002 | Joe et al. | |

FOREIGN PATENT DOCUMENTS

| | | |
|---|---|---|
| EP | 1 186 798 A2 | 3/2002 |
| JP | 8-277927 A | 10/1996 |

* cited by examiner

Primary Examiner—Gary Chin
Assistant Examiner—Ronnie Mancho
(74) Attorney, Agent, or Firm—Foley & Lardner LLP

(57) ABSTRACT

A system for enhanced ratio control in a continuously variable transmission (CVT) includes a ratio control element positionable by an actuator in response to an actuator command to establish various CVT ratios in the CVT. At least one sensor generates a train of pulses indicative of speed of rotation of a predetermined rotary member of the CVT. A measured CVT ratio generator derives information of an actual CVT ratio out of at least the train of pulses to give a measured value of CVT ratio. A filter processes the measured value of CVT ratio in a manner to refine the information of the actual CVT ratio to give an estimated value of CVT ratio. A command generator determines the actuator command such that the actuator command remains unaltered when a deviation of the estimated value of CVT ratio from a desired value of CVT ratio stays within a dead zone. A filter and command generator manager narrows the dead zone to meet precision requirement upon determination that the desired value of CVT ratio has been accomplished and adjusts filter gain at the filter in a manner to keep amplitude at frequency of noise that is contained in the measured value of CVT ratio within the narrowed dead zone.

22 Claims, 27 Drawing Sheets

SUB-ROUTINE
— GENERATING DESIRED CVT RATIO ($i_c^*$) —

ENTER (410)

DETERMINE AN ATTAINABLE VALUE $\omega_{te}$ OF ENGINE SPEED — 412

DETERMINE A DESIRED VALUE $i_{ct} = \dfrac{\omega_{te}}{\omega_{co}}$ OF SPEED RATIO — 414

DETERMINE A DESIRED VALUE $i_c^*$ OF CVT RATIO BY CALCULATING $(i_c^*)' = -c_r i_c^* + c_r i_{ct}$ — 416

EXIT

CVT RATIO (ESTIMATED) = $i_c$

CVT RATIO (PRECISION REQUIRED) = $i_{cl}$ OR $i_{ch}$

CVT RATIO (NOISEFREE) = $i_{cp}$

CVT RATIO (DESIRED) = $i_c^*$

ENHANCED RATIO CONTROL TO ESTABLISH CVT RATIO WITH EXCELLENT PRECISION

BACKGROUND OF THE INVENTION

1. Field of the Invention

The present invention relates to a method and a system for enhanced ratio control in a continuously variable transmission.

2. Description of the Background Art

Continuously variable transmissions (CVT's) are transmissions that change a speed ratio continuously, not in discrete intervals. This continuous nature of CVT's gives them an infinite number of speed ratios, making them very attractive for automotive use.

Various types of CVT are known. One such example is a CVT with pulley/V-belt power transfer. Another example is a CVT with disc/roller power transfer. The CVT of this type is often referred to as a toroidal-type CVT (TCVT) because it transmits torque from one rotating semi-toroidal disc to another semi-toroidal disc by traction rollers through a traction force. The two semi-toroidal discs form a toroidal cavity. In each toroidal cavity, it is preferred to have two traction rollers in equiangularly spaced relationship engaging the discs for transmission of motion therebetween. While three or four traction rollers may be disposed in spaced relationship in each toroidal cavity and will provide increased life for contact surfaces as the total surface area is increased, two traction rollers are preferred for simplicity.

Each traction roller is rotatably supported by a pivot trunnion, respectively. The pivot trunnions, in turn, are supported to pivot about their respective pivot axis. In order to controllably pivot the pivot trunnions for a ratio change, a hydraulic control means is provided. The hydraulic control means is included in a hydraulic cylinder at each pivot trunnion and includes a control volume defined in the hydraulic cylinder between a piston and an axial end of the hydraulic cylinder. The pistons within the hydraulic cylinders are connected to the pivot trunnions along their pivot axis by rods. The piston and its associated rod are thereby rotatable about the pivot axis with the associated pivot trunnion. Variation of the control volume causes the piston to move relative to the hydraulic cylinder, and applies a control force to displace the pivot trunnions. Control forces applied displace the pivot trunnions in the opposite directions along their pivot axis. As a result, the pivot trunnions are caused to pivot about their respective pivot axis, due to the forces present in the rotating toroidal discs, for initiating ratio change.

For terminating the ratio change when a desired ratio has been obtained, a feedback structure is provided. The feedback structure preferably includes a source of hydraulic pressure, and a ratio control valve for controlling the flow of hydraulic fluid for initiating ratio change. The feedback structure further includes a mechanism associated with at least one pivot trunnion to adjust the ratio control valve upon pivotal movement of the pivot trunnion to a desired ratio. The mechanism is preferably a cam connected to a pivot trunnion. The cam may be linked mechanically and/or electronically to operate the ratio control valve upon reaching a desired rotation.

In CVTs, a measured value of CVT involves noise, which may cause hunting in CVT ratio. Suppression of such hunting is proposed by JP-A 8-277927.

According to this known technique, a dead zone is provided. The width of dead zone is variable in response to revolution speed of CVT input or output member or the product of revolution speeds of CVT input and output members. The dead zone is compared to a deviation between a desired value of CVT ratio and a measured value of CVT ratio. When the deviation falls in the dead zone, a ratio change is suspended. The measured value of CVT ratio inevitably involves noise because trains of output pulses of revolution speed sensors are used in calculating a ratio between a revolution speed of a CVT input member and a revolution speed of a CVT output member.

This section is a description on noise inevitably included in a measured value of CVT ratio. Each unit of CVT uses revolution speed sensors, each of which includes a toothed wheel coupled to an input or output shaft, and a Hall element sensor. The sensors generate trains of pulses. A filter is provided to deal with noise contained in the measured value of CVT ratio. Due to product-by-product variability in processing accuracy of toothed wheels, the width of noise after filtering may differ from one unit to another. This noise problem has not been solved by the prior art because the width of a dead zone is controlled in an open loop manner. The width of the dead zone is difficult to nicely fit all noise situations derived from difference in the width of noise from one unit to another. To clearly illustrate this difficulty, FIGS. 26A, 26B and 26C have been prepared to consider, two cases, namely case 1 and case 2. FIG. 26A shows typical pattern of noise after filtering and dead zones of cases 1 and 2. As shown in FIG. 26A, the width of dead zone of case 1 is narrower than the width of dead zone of case 2. FIG. 26B illustrates a problem inherent with the case 1, while FIG. 26C illustrates a problem inherent with the case 2. As shown in FIG. 26B, the dead zone is exceeded, causing hunting of actuator command that leads to undesired pulsating ratio change. As shown in FIG. 26C, there remains a standing deviation from a desired value of CVT ratio.

A need remains for improving the conventional CVT ratio control to remove at least one of the following insufficiencies.

a) Due to hunting or standing wave, a CVT cannot always establish, with good precision, a predetermined value of CVT ratio required for moving the vehicle from standstill. In this case, the driver feels unpleasantly a difference in vehicle acceleration upon starting the vehicle. This predetermined value of CVT ratio is comparable to the lowest gear ratio in the conventional discrete type transmission.

b) Due to difficulty in establishing, with good precision, a desired value of CVT ratio, a usable range of CVT ratios is narrowed to leave a relatively wide margin at each of mechanical limits as illustrated in FIG. 27. Fuel economy may be improved by extending the usable range of CVT ratios sufficiently to provide a wide range of CVT ratios for fuel efficient operation with CVT ratios at high vehicle speeds. However, so extending the usable range of CVT ratios requires an increase in size of a CVT unit to provide the margins, pushing up manufacturing cost. If such increase in size of a CVT unit is not desired, one cannot accomplish an improvement in fuel economy as high as expected.

c) Difficulty in establishing, with good precision, a desired value of CVT ratio makes it difficult for an infinitely variable transmission (IVT) to have a geared neutral point (GNP). The IVT includes a CVT in combination with a constant ratio transmission and a planetary gearing mechanism. The GNP is a point at which an infinitely great ratio is established to provide zero driving force.

An object of the present invention is to provide a method and system for enhanced CVT control with intelligent noise management to accomplish a desired CVT ratio with excellent precision without hunting and standing deviation.

SUMMARY OF THE INVENTION

According to one aspect of the present invention, there is provided system for enhanced ratio control in a continuously variable transmission (CVT) including a ratio control element positionable by an actuator in response to an actuator command to establish various CVT ratios in the CVT, the system comprising:

a measured CVT ratio generator obtaining information of an actual CVT ratio established in the CVT to give a measured value of CVT ratio;

a filter processing the measured value of CVT ratio in a manner to refine the information of the actual CVT ratio to give an estimated value of CVT ratio;

a command generator determining the actuator command such that the actuator command remains unaltered when a deviation of the estimated value of CVT ratio from a desired value of CVT ratio stays within a dead zone; and a filter and command generator manager narrowing the dead zone to meet precision requirement upon determination that the desired value of CVT ratio has been accomplished and adjusting the filter to gain requirement for keeping the magnitude of signal at frequency of noise within the narrowed dead zone.

BRIEF DESCRIPTION OF THE DRAWINGS

The invention will be apparent from reading of the following description in conjunction with the accompanying drawings.

DESCRIPTION OF THE EMBODIMENTS

Figure 1:
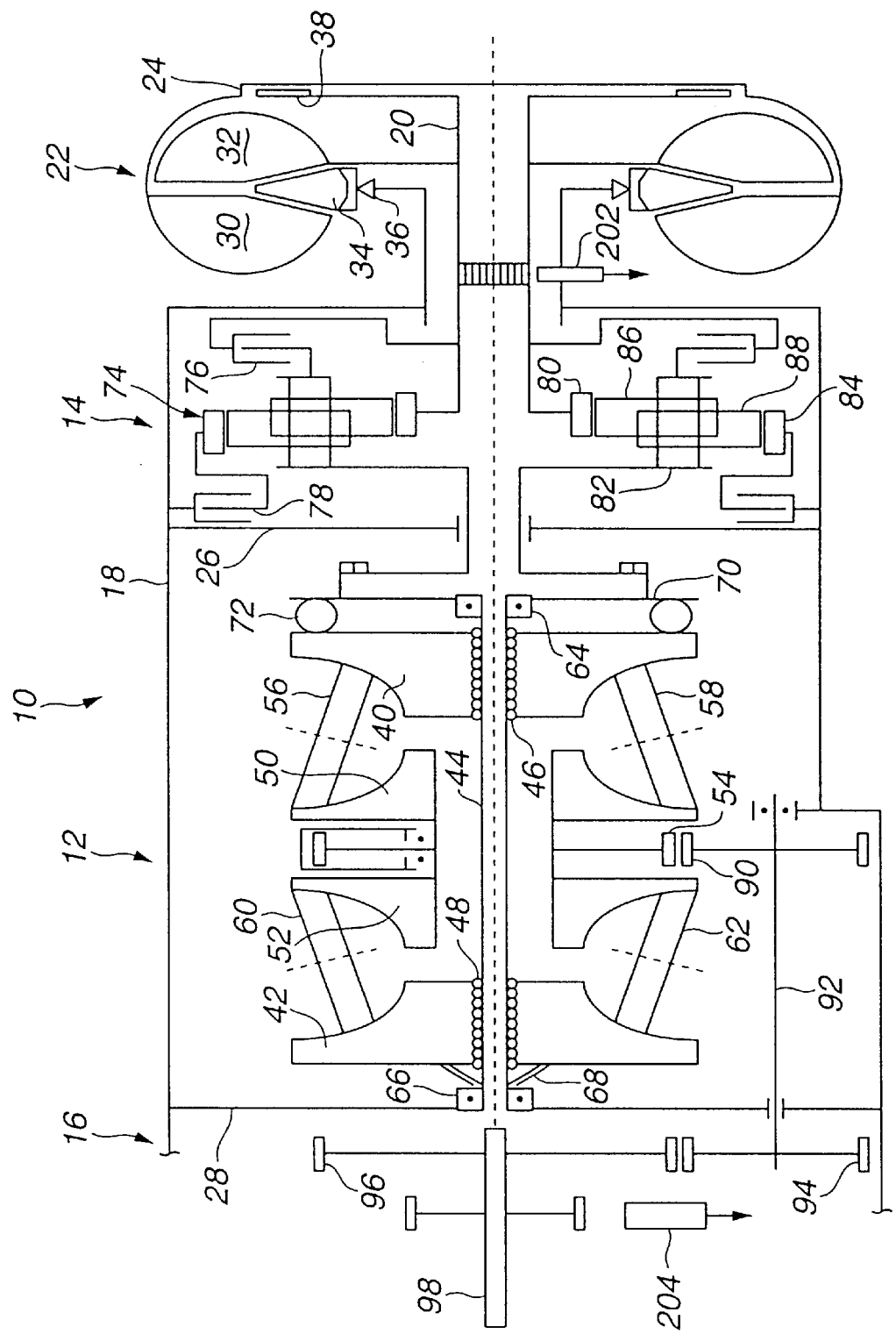
FIG. 1 is a schematic top view of a continuously variable transmission (CVT) including a dual cavity toroidal drive, a planetary drive, and a hydraulic drive.
Figure 2:
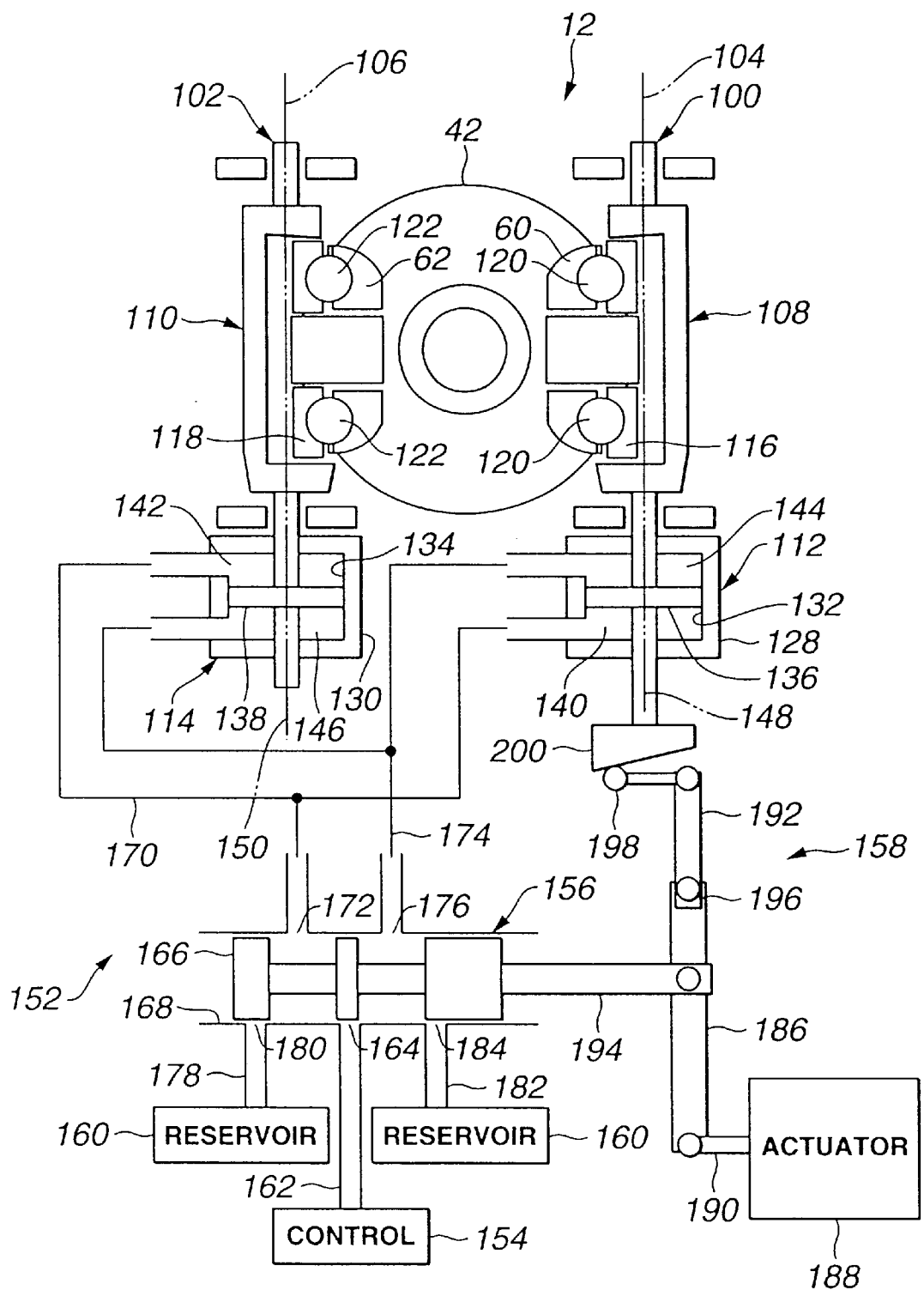
FIG. 2 is a schematic side view of a pair of traction roller assemblies disposed in the rearward cavity of the toroidal drive of FIG. 1 and a schematic representation of a pressure control for a traction drive.

Referring to FIGS. 1 and 2, a CVT 10 includes a dual cavity toroidal drive 12 coaxially connected to a forward positioned input gear section 14 and connected also to a rearward positioned output gear section 16. For purpose of clarification, the terms front or forward refer to the right side, and rear or rearward refer to the left side of the view shown in FIG. 1. All three elements 12, 14 and 16 are enclosed in a housing 18 and driven by an input or turbine shaft 20 that is powered by an engine (not shown) through a torque converter 22 or a lock-up clutch 24. Housing 18 has three chambers, one for each element 12, 14 and 16, separated by walls 26 and 28. Torque converter 22 is a conventional torque converter including a pump impeller 30 connected to the engine, a turbine runner 32 connected to input shaft 20, and a stator 34 grounded via a one-way brake 36. Lock-up clutch 24 is a conventional lock-up clutch including a clutch element 38 connected to input shaft 20.

Dual cavity toroidal drive 12 includes first and second outboard traction discs 40 and 42 mounted on a torque sleeve 44 via ball splines 46 and 48 to rotate in unison. Toroidal drive 12 further includes two inboard traction discs 50 and 52, which are positioned back-to-back and rotatably mounted on sleeve 44, and both coupled to an output gear 54 to rotate in unison. Two inboard traction discs 50 and 52 may be formed as one integral element formed with output gear 54. In this case, the integral element is a dual-faced single disc element rotatably supported by sleeve 44. One example of a dual cavity toroidal drive having dual inboard discs positioned back-to-back is disclosed in U.S. Pat. No. 5,902, 208 issued May 11, 1999 to Nakano, which is incorporated in its entirety herein by reference. Another example of a dual cavity toroidal drive having a dual-faced single disc element formed with an output gear is disclosed in co-pending U.S. patent application Ser. No. 09/940,875 commonly assigned herewith, which is incorporated in its entirety herein by reference. This incorporated U.S. patent application Ser. No. 09/940,875 has the corresponding European Patent Application published under EP 1 186 798 A2 on Mar. 13, 2002. A toroidal cavity is defined between each outboard discs 40 and 42 and one of the inboard discs 50 and 52. A pair of motion transmitting traction rollers 56, 58, 60 and 62 is disposed in each toroidal cavity, with one roller being disposed transversely on either side of each cavity (see FIGS. 1 and 2). Each pair of traction rollers 56, 58, 60 and 62 is a mirror image of the other pair. Therefore, only the one pair of rollers 60 and 62 is illustrated in FIG. 2. Each pair of traction rollers 56, 58, 60 and 62 are engaged between each outboard discs 40 and 42 and one of the inboard discs 50 and 52 in circles of varying diameters depending on the transmission ratio. Traction rollers 56, 58, 60 and 62 are so supportive that they can be moved to initiate a change in the ratio. That is, each roller 56, 58, 60 and 62 can be actuated to vary its diameter and provide a substantial normal force at their points of contact with the corresponding discs to sufficiently support the traction forces needed to effect the change in ratio. With outboard discs 40 and 42 being rotated continuously by the engine, outboard discs 40 and 42 impinge on traction rollers 56, 58, 60 and 62, causing the traction rollers to rotate. As they rotate, the traction rollers impinge on and rotate inboard discs 50 and 52 in a direction opposite to that of rotating outboard discs 40 and 42. The structure and operation of the other elements of the toroidal drive 12 will be discussed later on in the specification.

With continuing reference to FIG. 1, toroidal drive 12 employs a cam loading system to control normal force between toroidal discs (50, 52, 60, 62) and traction rollers (56, 58, 60, 62). The cam loading system operates on outboard discs 40 and 42 to apply an axial force that is a linear function of the input torque. Describing, in detail, the cam loading system, torque sleeve 44 extends beyond the backs of outboard discs 40 and 42 and has flanges (not shown) at its front and rear ends to carry thrust bearings 64 and 66. The cam loading system includes a disc spring (Belleville spring) 68, which is supported on torque sleeve 44 between thrust bearing 66 and the back of toroidal disc 42 to operate on the disc. The cam loading system also includes a drive plate 70 rotatably supported by torque sleeve 44 via thrust bearing 64. The cam loading system further includes cam rollers 72, which are disposed between drive plate 70 and toroidal disc 40. An example of a cam loading system having cam rollers between a drive plate and one of outboard toroidal discs is disclosed in U.S. Pat. No. 5,027,668 issued Jul. 2, 1991 to Nakano, which is incorporated in its entirety herein by reference.

Drive plate 70 of the cam loading system is drivingly connected to input shaft 20 through input gear section 14. Input gear section 14 includes a dual-pinion planetary gear system (DPGS) 74, a forward clutch 76, and a reverse brake 78. DPGS 74 includes, in a conventional manner, a sun gear 80, a carrier 82, a ring gear 84, and a plurality of pairs of intermeshed planet pinions 86 and 88 rotatably supported by pins of carrier 82. Pinions 86 and 88 are disposed between sun and ring gears 80 and 84, with inner pinions 86 in engagement with sun gear 80 and outer pinions 88 in engagement with ring gear 84. Sun gear 80 is coupled with input shaft 20 to rotate in unison. Carrier 82 is connected to drive plate 70 of the cam loading system for rotation in unison. Carrier 82 is connectable to input shaft 20 through forward clutch 76. Ring gear 84 is connectable to housing 18 through reverse brake 78.

Input gear section 14 including DPGS 74 functions to establish torque transmission in forward drive mode or reverse drive mode. In the forward drive mode, forward clutch 76 is engaged with reverse brake 78 released. In the reverse drive mode, reverse brake 78 is applied with forward clutch 76 disengaged. In this manner, input torque is applied to drive plate 70 to continuously rotate outboard toroidal discs 40 and 42 in the same direction as that of input shaft 20 in the forward drive mode, but in a direction opposite to that of input shaft 20 in the reverse drive mode. The input torque is transmitted from outboard discs 40 and 42 to inboard discs 50 and 52 to rotate output gear 54.

Output gear section 16 including an input gear 90 of a counter shaft 92 functions to provide torque transmission from output gear 54. Output gear 54 is in engagement with input gear 90 of counter shaft 92, which has an output gear 94. Output gear section 16 also includes a gear 96 of an output shaft 98. Output gear section 16 may include an idler gear (not shown) between output gear 94 and gear 96. Rotation of inboard toroidal discs 50 and 52 is transmitted via output gear 54, gear 90, counter shaft 92, gear 94 and gear 96 to output shaft 98.

Referring to FIG. 2, toroidal drive 12 in this embodiment includes two traction rollers 60, 62 in each toroidal cavity. Each of the rollers 60, 62 is rotatably supported by a pivot trunnion 100, 102, respectively. Pivot trunnions 100, 102, in turn, are supported to pivot about their respective pivot axis 104, 106. Each of traction rollers 60, 62 and the corresponding pivot trunnion 100, 102 are components of traction roller assemblies 108, 110.

As is well known to those skilled in the art, the surfaces of toroidal discs 40, 42, 50, 52 defining cavities have a radius of curvature, the origin of which coincides with the pivot axis 104, 106. This geometry permits the pivot trunnions and traction rollers to pivot and maintain contact with the surfaces of the toroidal discs.

Traction roller assemblies 108, 110 each also include a hydraulic piston assembly 112, 114 in addition to the pivot trunnion 100, 102. Pivot trunnions 100, 102 each have a backing plate 116, 118 that supports traction roller 60, 62 rotatably. Bearings 120, 122, positioned between plate 116, 118 and traction roller 60, 62, permit relative rotation between backing plate 116, 118 and traction roller 60, 62. Backing plates 116, 118 each have an extension 124, 126 that supports traction roller 60, 62, on a bearing not shown, for rotation.

Hydraulic piston assembly 112, 114 includes a housing 128, 130 enclosing a cylinder 132, 134 in which is slidably disposed a piston and rod 136, 138. Piston and rod 136, 138 divides cylinder 132, 134 into equal area chambers including a first chamber 140, 142 and a second chamber 144, 146. Piston and rod 136, 138 is disposed so that its centerline 148, 150 is disposed substantially along pivot axis 104, 106, respectively. So positioned, piston and rod 136, 138 is able to pivot about pivot axis 104, 106 with pivot trunnion 100, 102, respectively.

The pressure in first and second chambers 140, 142; 144, 146 are established by a hydraulic control system 152. Hydraulic control system 152 includes a pump, not shown, an electro-hydraulic control 154, a ratio control valve 156, and a feedback structure 158. The pump is a conventional pump that draws hydraulic fluid from a reservoir 160 and delivers the fluid to electro-hydraulic control 154 from which the fluid is delivered to ratio control valve 156.

Control 154 delivers system (or line) pressure Pl to a passage 162 that is connected to an inlet port 164 of ratio control valve 156. Ratio control valve 156 has a spool 166 slidably disposed in a valve bore 168. Valve bore 168 is in fluid communication with passage 162 via inlet port 164. Valve bore 168 is also in fluid communication with a first control passage 170 via a first control port 172, and with a second control passage 174 via a second control port 176. Valve bore 168 is further in fluid communication with a first drain passage 178 via a first drain port 180, and with a second drain passage 182 via a second drain port 184.

Spool 166 is connected to a feedback lever 186, which is a component of feedback structure 158. A ratio actuator 188, in the form of a stepper motor, for example, receives a control signal. The control signal is an actuator command indicative of motor steps if a stepper motor is used as the actuator. In response to the control signal, actuator 188 moves feedback lever 186, connected to an actuator shaft 190, to initiate the ratio change in toroidal drive 12. Feedback lever 186 is connected to actuator shaft 190 at one end and to a bell crank 192 at the other end. At a point between the two ends, the feedback lever 186 is pivotally connected to a spool rod 194, which is connected to spool 166 to move in unison. Bell crank 192 has one end 196 pivotally connected to the other end of feedback lever 186 and the other end 198. The other end 198 of bell crank 192 is controlled by the angular position about pivot axis 104 of traction roller assembly 108 through contact with a cam 200 formed on piston and rod 136. As actuator 188 moves feedback lever 186, valve 156 alters, in response to movement of valve rod 194, the hydraulic pressure in lines 170 and 174. Hydraulic pressure is provided to the valve 156 through line 162, which is supplied with system or line pressure. As the pressure in lines 170 and 174 is altered, traction roller assemblies 108 and 110 move along pivot axis 104 and 106 in the opposite directions and then pivot about pivot axis 104 and 106, changing the ratio in toroidal drive 12. As traction roller assembly 108 pivots, lever 186 moves, due to rotation of cam 200 and movement of bell crank 192, repositioning valve rod 194, providing means for valve 156 to reinstate the pressure in lines 170 and 174 to stop traction roller assemblies 108 and 110 from pivoting.

Actuator 188 controls displacement of actuator shaft 190, which, in turn, controls the ratio in toroidal drive 12. If actuator 188 is in the form of a stepper motor, as is in exemplary embodiments of the present invention, controlling angular displacement of stepper motor in terms of motor steps controls the ratio in toroidal drive 12.

In the embodiment shown in FIG. 1, an input speed sensor 202 detects the speed of rotation of the input shaft 20, and an output speed sensor 204 detects the speed of rotation of the output shaft 98. The output of the sensor 202 may be used in deriving information of the speed of rotation of the outboard disc 40, which may be called an input disc. The output of the sensor 204 may be used in deriving information of the speed of rotation of the inboard disc 50, which may be called an output disc.

Figure 3:
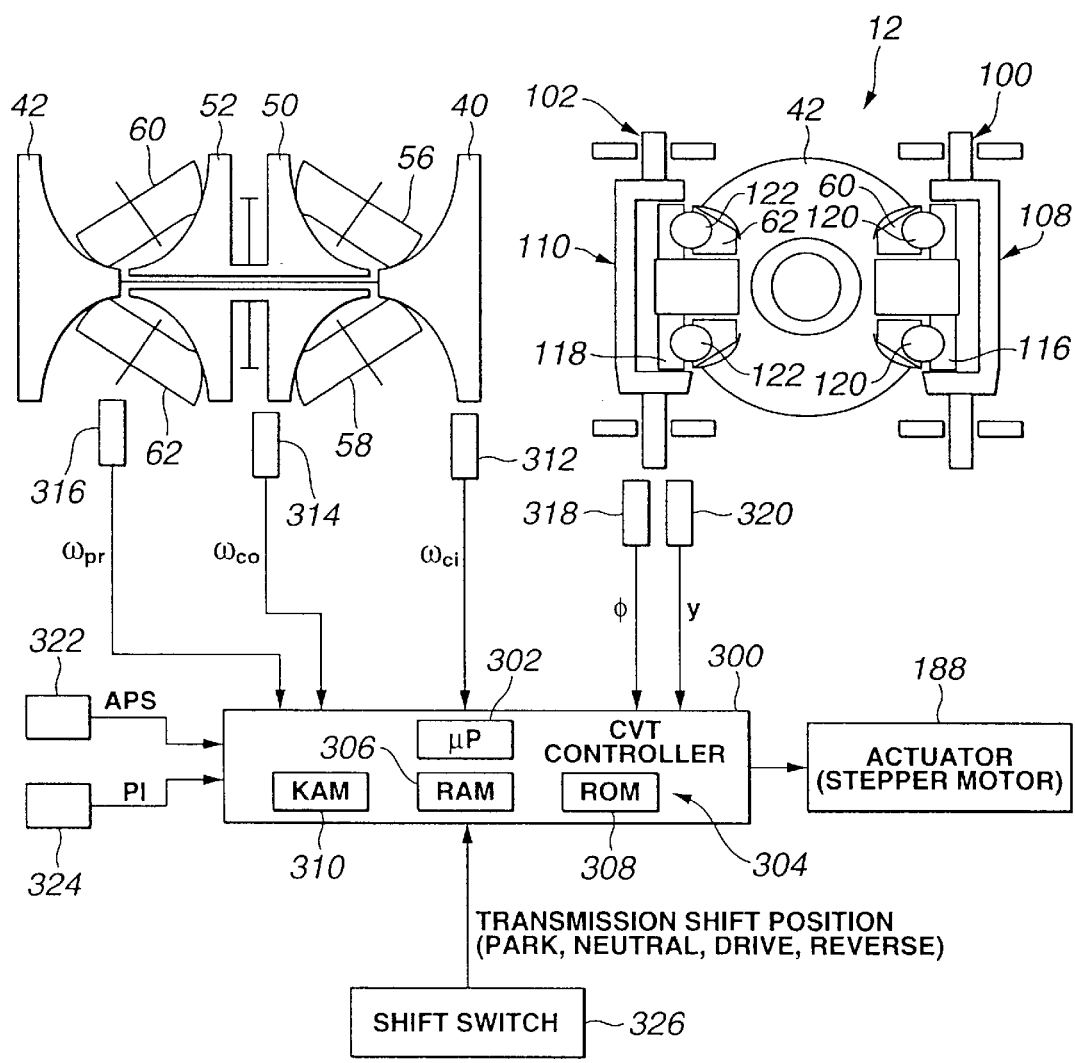
FIG. 3 is a block diagram showing the relationship between a CVT controller and an actuator.

With reference now to FIG. 3, in an exemplary embodiment of the present invention, a CVT controller 300 comprises a microprocessor-based controller with an associated microprocessor, represented by a microprocessor 302. The microprocessor 302 communicates with associated computer-readable storage media 304. As will be appreciated by one of ordinary skilled in the art, the computer-readable storage media 304 may include various devices for storing data representing instructions executable by the microprocessor to control the TCVT 10. For example, the computer-readable storage media 304 may include a random access memory (RAM) 306, a read-only memory (ROM) 308, and/or a keep-alive memory (KAM) 310. These functions may be carried out through any of a number of known physical devices including EPROM, EEPROM, flash memory, and the like. The present invention is not limited to a particular type of computer-readable storage medium, examples of which are provided for convenience of description only.

The CVT controller 300 may also include appropriate electronic circuitry, integrated circuits, and the like to carry out control of the CVT 10. As such, the controller 300 is used to carry out control logic implemented in terms of software (instructions) and/or hardware components, depending upon the particular application. Additional description on details of control logic implemented by the controller 300 is provided later.

In order to derive information of operating conditions of the CVT 10 and operator power/torque demand, the controller 300 may communicate directly or indirectly with at least some of various sensors and/or switches. In FIG. 3, all such sensors and/or switches are illustrated. The various sensors include an input speed sensor 312 and an output speed sensor 314. The input speed sensor 312 may be provided to measure speed of rotation of the input disc 40, while the output speed sensor 314 may be provided to measure speed of rotation of the output disc 50. As the input disc 40 rotates, the input speed sensor 312 generates a train of pulses indicative of speed of rotation of the input disc 40. As the output disc 50 rotates, the output speed sensor 314 generates a train of pulses indicative of speed of rotation of the output disc 50. The various sensors include a traction roller speed sensor 316. The traction roller speed sensor 316 may be provided to measure speed of rotation of the traction roller 62. As the traction roller 62 rotates, the traction roller speed sensor 316 generates a train of pulses indicative of speed of rotation of the traction roller 62. In order to give a measured value $\omega_{ci}$ of speed of rotation of the input disc 40, the CVT controller 300 derives information of an actual speed of rotation of the input disc 40 out of the train of pulses generated by the input speed sensor 312. In order to give a measured value $\omega_{co}$ of speed of rotation of the output disc 50, the CVT controller 300 derives information of an actual speed of rotation of the output disc 50 out of the train of pulses generated by the output speed sensor 314. In order to give a measured value $\omega_{pr}$ of speed of rotation of the traction roller 62, the CVT controller 300 derives information of an actual speed of rotation of the traction roller 62 out of the train of pulses generated by the roller speed sensor 316.

The various sensors and/or switches also include a trunnion angular position sensor 318, a trunnion axial displacement sensor 320, an accelerator pedal sensor 322, a line pressure switch 324 and a shift switch 326.

The trunnion angular position sensor 318 may be provided to measure an actual trunnion angular position. The trunnion axial displacement sensor 320 may be provided to measure an actual trunnion axial displacement from its neutral stable position. In order to give a measured value $\phi$ of trunnion angular position, the CVT controller 300 derives information of an actual trunnion angular position from the output of the trunnion angular position sensor 318. In order to give a measured value y of trunnion axial displacement, the CVT controller 300 derives information of an actual trunnion axial displacement from the output of the trunnion axial displacement sensor 320.

The CVT controller 300 derives information of an accelerator pedal stoke or position (APS) from the output of the accelerator pedal sensor 322. The CVT controller 300 derives information of an actual line pressure Pl from the output of the line pressure switch 324. The CVT controller 300 derives information of transmission shift position (Park, Neutral, Drive, Reverse) from the output of the shift switch 326.

The CVT controller 300 determines and applies an actuator command to the stepper motor 188. In one exemplary embodiment (see FIG. 15), the CVT controller 300 determines motor steps rate v and generates an actuator command indicative of the determined motor steps rate v. Apparently, the motor steps rate v corresponds to CVT ratio rate. In another exemplary embodiment (see FIG. 16), the CVT controller 300 determines motor steps u and generates an actuator command indicative of the determined steps u.

From the preceding description, it is to be noted that the CVT 10 includes a ratio control element, in the form of the actuator shaft 190 (see FIG. 2). The ratio control element is positionable in response to the actuator command applied to the actuator 188 to establish various speed ratios between input and output shafts 20 and 98 of the CVT 10.

Figure 4:
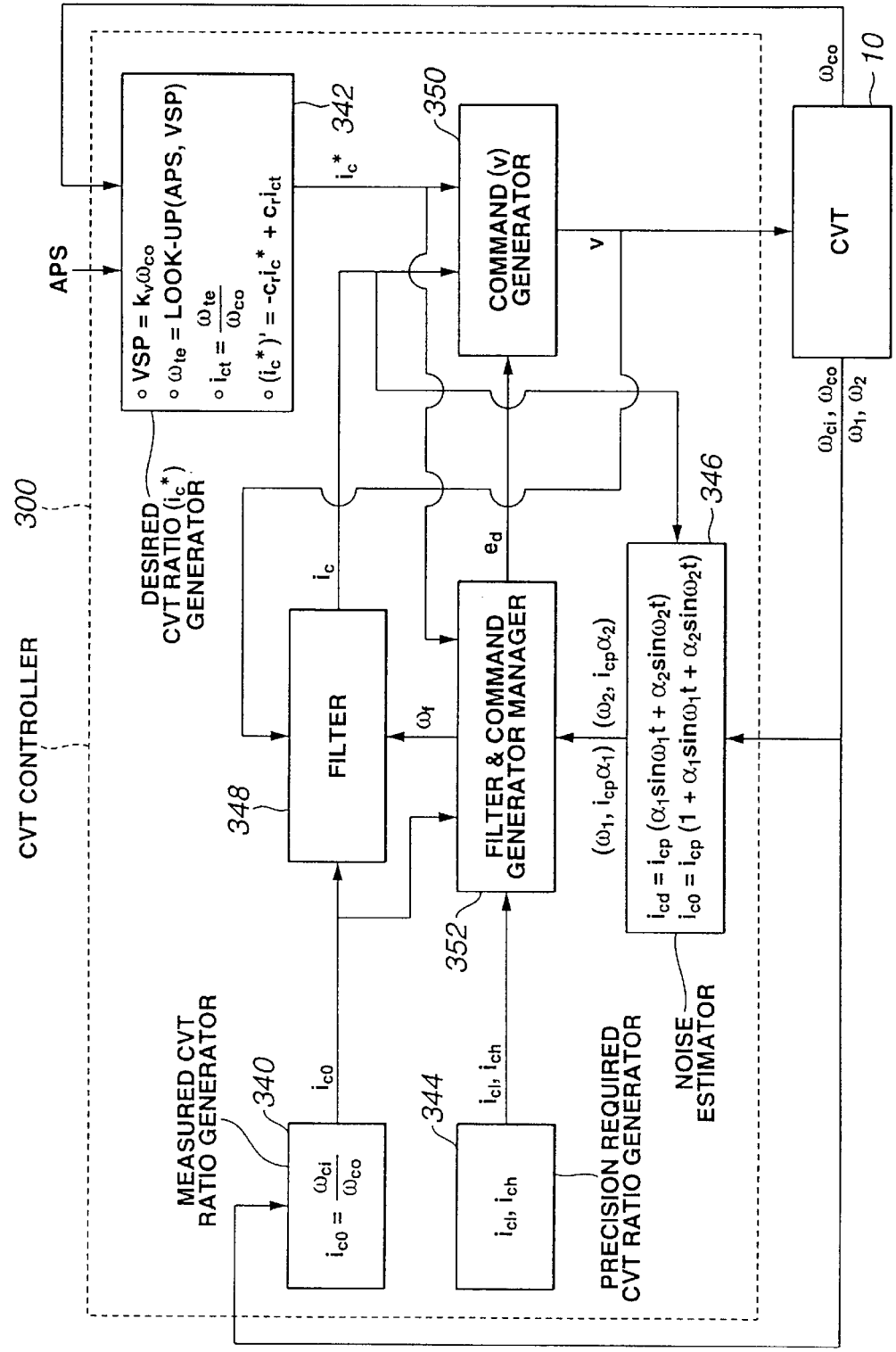
FIG. 4 is a control diagram of a CVT controller according to the present invention.

An exemplary embodiment according to the present invention can be understood with reference to control diagram shown in FIG. 4. In FIG. 4, the measured value $\omega_{ci}$ of speed of rotation of the input disc 40, and the measured value $\omega_{co}$ of speed of rotation of the output disc 50 are used as system inputs. Motor steps rate v is used as a system output.

For illustration purpose, the measured value $\omega_{ci}$ of speed of rotation of the input disc 40 is referred to as a measured value of CVT input member or shaft, and the measured value $\omega_{co}$ of speed of rotation of the output disc 50 as a measured value of CVT output member or shaft speed. For the same purpose, the speed ratio between the input disc 40 and the output disc 50 is referred to as a CVT ratio. Thus, a speed ratio between the measured value $\omega_{ci}$ of CVT input shaft speed and the measured value $\omega_{co}$ of CVT output shaft speed is referred to as a measured value $i_{cO}$ of CVT ratio.

In FIG. 4, the measured value $\omega_{ci}$ of CVT input shaft speed and the measured value $\omega_{co}$ of CVT output shaft speed are provided outside of the CVT controller 300. To give the measured values $\omega_{ci}$ and $\omega_{co}$ of CVT input shaft speed and CVT output shaft speed, a counter counts the number of pulses generated by the input speed sensor 312 and the number of pulses generated by the output speed sensor 314. The counter feeds the counts to a timer. With the information provided by the timer, a microprocessor can compute the measured values $\omega_{ci}$ and $\omega_{co}$ of CVT input shaft speed and CVT output shaft speed. In the case where such microprocessor is provided inside the CVT controller 300 or the microprocessor 302 (see FIG. 3) of the CVT controller 300 performs the function, the measured value $\omega_{ci}$ of CVT input shaft speed and the measured value $\omega_{co}$ of CVT output shaft speed are provided inside the CVT controller 300. In any case, the measured values $\omega_{ci}$ and $\omega_{co}$ cannot avoid influences of noise that may occur in the train of pulses generated by the input and output speed sensors 312 and 314.

With continuing reference to FIG. 4, a measured CVT ratio generator 340 is provided. The measured value $\omega_{ci}$ of CVT input shaft speed and the measured value $\omega_{co}$ of CVT output shaft speed are used as inputs to the measured CVT ratio generator 340. The measured CVT ratio generator 340 obtains information on an actual CVT ratio established in the CVT 10 to give a measured value $i_{cO}$ of CVT ratio. The measured CVT ratio generator 340 outputs the measured value $i_{cO}$ of CVT ratio. In this embodiment, the measured value $i_{cO}$ of CVT ratio is given by dividing the measured value $\omega_{ci}$ of CVT input shaft speed by the measured value $\omega_{co}$ of CVT output shaft speed. Thus, the measured value $i_{cO}$ is expressed as:

$$i_{cO} = \frac{\omega_{ci}}{\omega_{co}} \quad (1)$$

The present invention is not limited to this example of giving a measured value $i_{cO}$ of CVT ratio. There are various examples of giving a measured value $i_{cO}$ of CVT ratio.

Estimating a measured value $i_{cO}$ of CVT ratio from a measured value $\phi_o$ of trunnion angular position $\phi$ is one example. In this case, the estimation is made using the following equation.

$$i_c = \frac{1 + \eta - 2\cos(2\theta - \phi)}{1 + \eta - \cos\phi} i_e \quad (2)$$

where: $i_c$ is an estimated value of CVT ratio;

$\eta$, $\theta$ and $i_e$ are constants that are determined according to mechanical specification of the CVT 10.

Estimating values $\omega_{ci}$ and $\omega_{co}$ of CVT input shaft speed and CVT output shaft speed from a measured value $\omega_{pr}$ of traction roller speed and a measured value $\phi_o$ of trunnion angular position $\phi$ is another example. In this case, a measured value $i_{cO}$ of CVT ratio is calculated after making the estimation of $\omega_{ci}$ and $\omega_{co}$ is made using the following equations.

$$\omega_{ci} = \frac{\sin\theta}{1 + \eta - \cos\phi} \omega_{pr} \quad (3)$$

$$\omega_{co} = \frac{\sin\theta}{1 + \eta - \cos(2\theta - \phi)} \omega_{pr} \quad (4)$$

A desired CVT ratio generator 342 is provided. An APS from the accelerator pedal sensor 322 and measured value $\omega_{co}$ of CVT output shaft speed are used as inputs to the desired CVT ratio generator 342. First, the measured value $\omega_{co}$ of CVT output shaft speed is processed to give a vehicle speed VSP. The vehicle speed VSP is expressed as:

$$VSP = k_v \omega_{co} \quad (5)$$

where: $k_v$ is a constant that is determined accounting for the overall gear ratio from the output shaft 98 (see FIG. 1) to a tire a vehicle installed with the CVT 10 and the radius of the tire.

Figure 13:
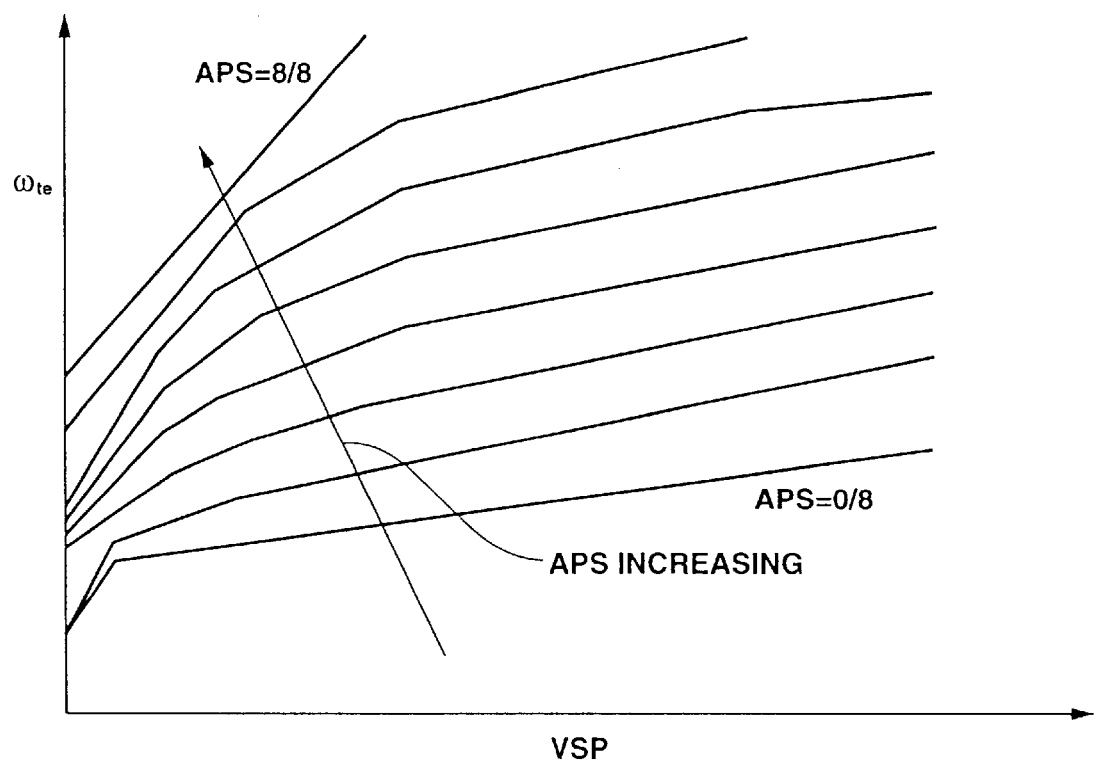
FIG. 13 is a shift map.

In the embodiment, the desired CVT ratio generator 342 includes a look-up map in computer-readable storage media 304 (see FIG. 3). One example of such a look-up map is a shift map shown in FIG. 13. In FIG. 13, contour lines are illustrated for different values of APS, such as 0/8, 1/8, . . . 8/8. Each line represents varying of desired value $\omega_{te}$ of engine speed with different values of vehicle speed VSP for the same value of accelerator pedal position APS.

The desired CVT ratio generator 342 calculates a desired ratio $i_{ct}$ between the desired value $\omega_{te}$ of engine speed and the measured value $\omega_{co}$ of CVT output shaft speed. This ratio is expressed as $$i_{ct} = \frac{\omega_{tc}}{\omega_{co}} \tag{6}$$

The desired CVT ratio generator 342 includes a filter that is expressed as $$(i_c^*)' = -c_r i_c^* + c_r i_{ct} \tag{7}$$

where: $c_r$ is a constant equivalent to a time constant that is determined accounting for shift feel.

The filter expressed by the equation (7) processes the desired ratio $i_{ct}$ to give a desired value $i_c^*$ of CVT ratio. The desired CVT ratio generator 342 outputs the desired value $i_c^*$ of CVT ratio.

There is precision requirement that, in the CVT 10, at least one or some CVT ratios should be established with excellent precision. To express such precision requirement, a precision required CVT ratio generator 344 is provided. The precision required CVT ratio generator 344 outputs a precision required value of CVT ratio. There are various examples of the precision required value of CVT ratio. One example is the largest value $i_{cl}$ of CVT ratio, which is used upon moving the vehicle from standstill and defines the lower limit of a range of CVT ratios that the CVT 10 is capable of establishing. Another example is the smallest value $i_{ch}$ of CVT, which defines the higher limit of the range of CVT ratios. Other example is a value of CVT ratio to be established to provide a GNP in an IVT.

Figure 27:
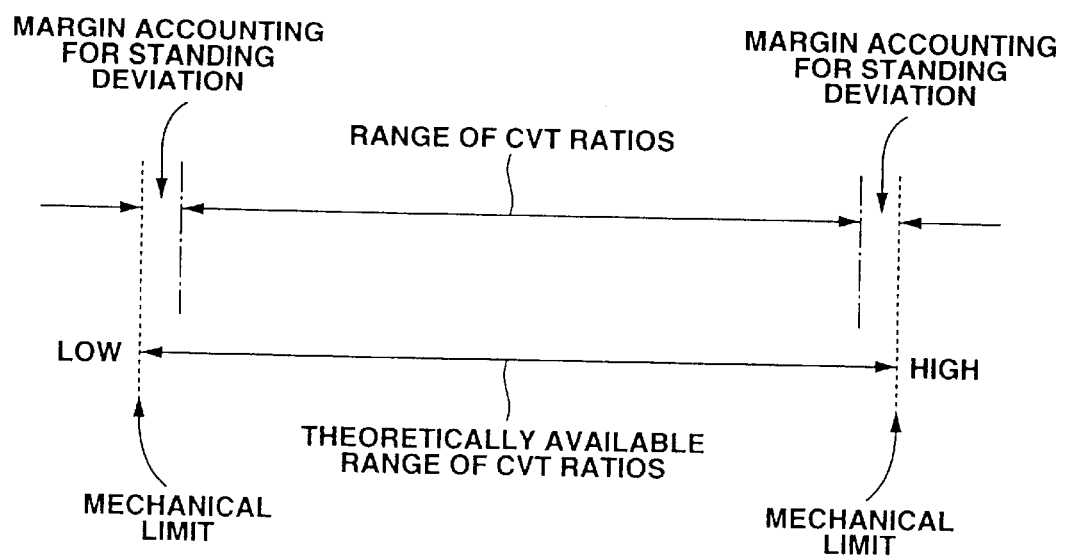
FIG. 27 is a diagram illustrating a conventional setting of a range of CVT ratios.

In one exemplary embodiment, the precision required CVT ratio generator 344 outputs both largest and smallest values $i_{cl}$ and $i_{ch}$ of CVT ratio, which defines the lower and upper limits of a range of CVT ratios that the CVT 10 is capable of establishing. So establishing the largest and smallest values $i_{cl}$ and $i_{ch}$ of CVT ratio to meet the precision requirement narrows margins needed at mechanical limits (see FIG. 27) sufficiently, allowing a range of CVT ratios to extend toward the mechanical limits. This makes it possible to set a sufficiently wide range of CVT ratios without modifying the size of a CVT unit to increase a range of CVT ratios between mechanical limits. So setting the sufficiently wide range of CVT ratios allows use of appropriate CVT ratios for good fuel consumption by a prime mover, for example, an engine, during operation at high vehicle speeds, enhancing fuel economy. As the largest value $i_{cl}$ of CVT ratio is established with excellent precision every time the vehicle is to move from standstill, providing the vehicle operator with the same acceleration feel.

With continuing reference to FIG. 4, a noise estimator 346 is provided. The noise estimator 346 estimates the frequency of noise and the magnitude thereof. The input speed sensor 312 is provided to generate a train of synchronous pulses with rotation of input disc 40. The output speed sensor 314 is provided to generate a train of synchronous pulses with rotation of output disc 50. The train of synchronous pulses from the input speed sensor 312 is processed, for example, by calculating period of the pulses or frequency thereof. Based on the calculated period or frequency, the measured value $\omega_{ci}$ of CVT input shaft speed is given. Likewise, the train of synchronous pulses from the output speed sensor 314 is processed, for example, by calculating period of the pulses or frequency thereof. Based on the calculated period or frequency, the measured value $\omega_{co}$ of CVT output shaft speed is given. Using the equation (1), the measured value $i_{co}$ of CVT ratio is given by calculation based on the measured values $\omega_{ci}$ and $\omega_{co}$. In this case, the noise estimator 346 estimates the measured value $i_{co}$ of CVT ratio using the equation as follows:

$$i_{co} = i_{cp}(1 + \alpha_1 \sin \omega_1 t + \alpha_2 \sin \omega_2 t) \tag{8}$$

where: $i_{cp}$ is a pure value of CVT ratio that is free from noise;

$\alpha_1$ is constant that is determined accounting for angular displacement and the processing precision of teeth of a wheel of the input speed sensor 312;

$\alpha_2$ is constant that is determined accounting for angular displacement and the processing precision of teeth of a wheel of the output speed sensor 314;

$\omega_1$ is a measured value of frequency of synchronous pulses of the input speed sensor 312 with rotation of input disc 40; and $\omega_2$ is a measured value of frequency of synchronous pulses of the output speed sensor 314 with rotation of output disc 50.

In the equation (8), the pure value $i_{cp}$ of CVT ratio appears. This value $i_{cp}$ may be derivable from the measured value $i_{co}$ of CVT ratio or an estimated value $i_c$ of CVT ratio, which will be described later.

If period $T_{in}$ of the synchronous pulses of the input speed sensor 312 is measured, the measured frequency $\omega_1$ is given by calculating the equation as:

$$\omega_1 = \frac{2\pi}{T_{in}} \tag{9-1}$$

If period $T_{out}$ of the synchronous pulses of the output speed sensor 314 is measured, the measured frequency $\omega_2$ is given by calculating the equation as:

$$\omega_2 = \frac{2\pi}{T_{out}} \tag{9-2}$$

Noise $i_{cd}$ of the measured value $i_{co}$ of CVT ratio can be derived from the equation (8) and expressed as:

$$i_{cd} = i_{cp}(\alpha_1 \sin \omega_1 t + \alpha_2 \sin \omega_2 t) \tag{10}$$

Figure 11:
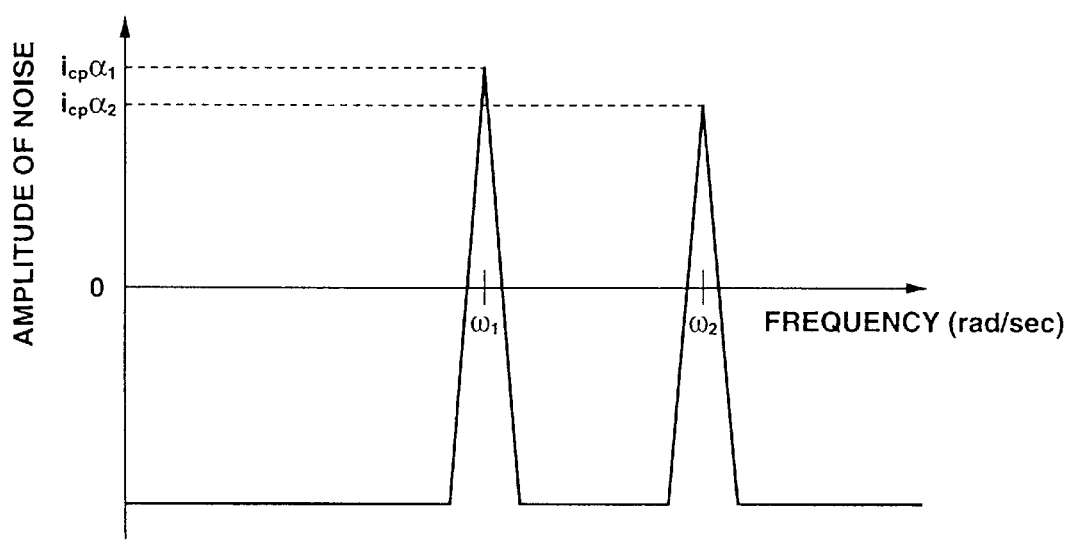
FIG. 11 is amplitude vs., frequency characteristic of noise contained in a measured value of CVT ratio.

FIG. 11 illustrates the noise $i_{cd}$ in magnitude at frequencies $\omega_1$ and $\omega_2$. The noise estimator 346 makes estimates ($\omega_1$, $i_{cp}\alpha_1$) and ($\omega_2$, $i_{cp}\alpha_2$) as frequencies of noise and magnitudes thereof at the frequencies. The frequency of noise $\omega_1$ is proportional to the measured value $\omega_{ci}$ of CVT input shaft speed. The lower the measured value $\omega_{ci}$ of CVT input shaft speed, the lower the frequency of noise $\omega_1$. In the case a band reject filter is used, the band of frequency to be rejected is lowered as the CVT input shaft speed drops. This measure is effective in suppressing the standing deviation in CVT ratio to keep it within a dead zone even if the frequency of noise $\omega_1$ changes due to change in CVT input shaft speed. The frequency of noise $\omega_2$ is proportional to the measured value $\omega_{co}$ of CVT output shaft speed.

With continuing reference to FIG. 4, a filter 348 is provided. The measured value $i_{co}$ of CVT ratio is used as input of the filter 348. The filter 348 processes the measured value $i_{co}$ of CVT ratio in a manner to refine the information of the actual CVT ratio to give an estimated value $i_c$ of CVT ratio. The filter 348 outputs the estimated value $i_c$ of CVT ratio. There are various examples of the filter 348. One example is a filter 348A illustrated in FIG. 5, which employs a low pass filter $W_1$. Another example is a filter 348B illustrated in FIG. 7, which employs an observer as a low pass filter. Other example is a filter 348C illustrated in FIG. 10, which employs a band reject filter.

Figure 5:
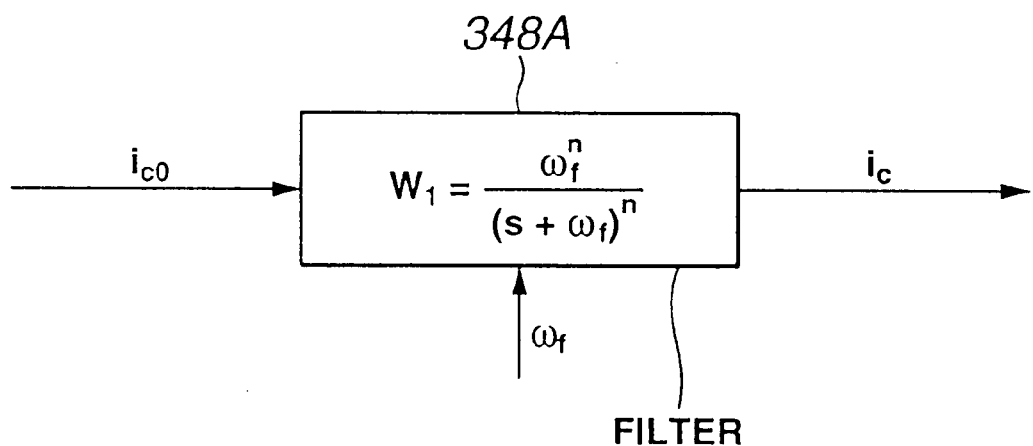
FIG. 5 is a portion of a control diagram of a CVT controller using a low pass filter.
Figure 6:
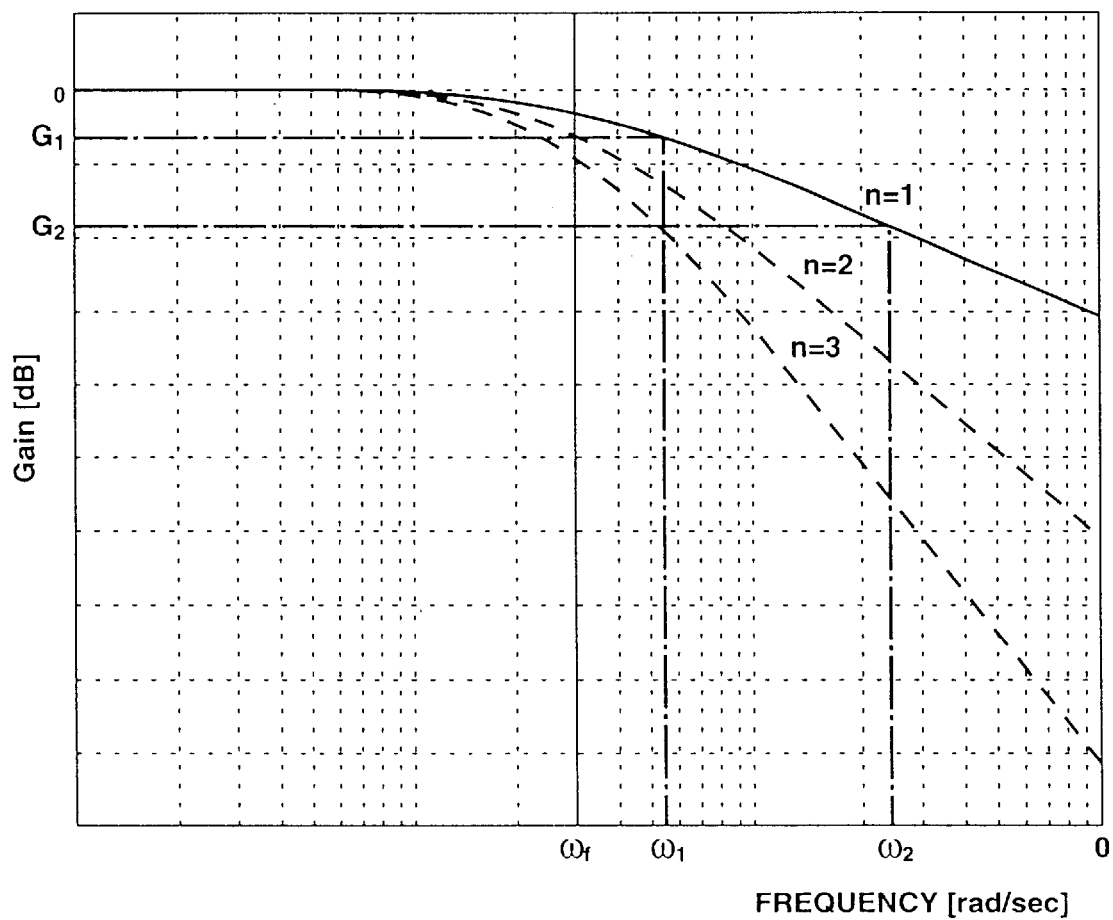
FIG. 6 is a gain vs., frequency characteristic of the low pass filter.

With reference also to FIGS. 5 and 6, the low pass filter $W_1$ is expressed as:

$$W_1 = \frac{\omega_f^n}{(s+\omega_f)^n} \tag{11}$$

where: s is the Laplacian;
$\omega_f$ is cutoff frequency;
n is exponent determined accounting for the magnitude of noise and CVT ratio rate.

FIG. 6 is a gain vs., frequency characteristic of the low pass filter $W_1$. As it clearly shows, the gain within a higher frequency band than the cutoff frequency $\omega_f$ becomes small as the exponent n becomes large. Accounting for the magnitude of noise and CVT ratio rate, an appropriate value should be set as the exponent n.

Figure 7:
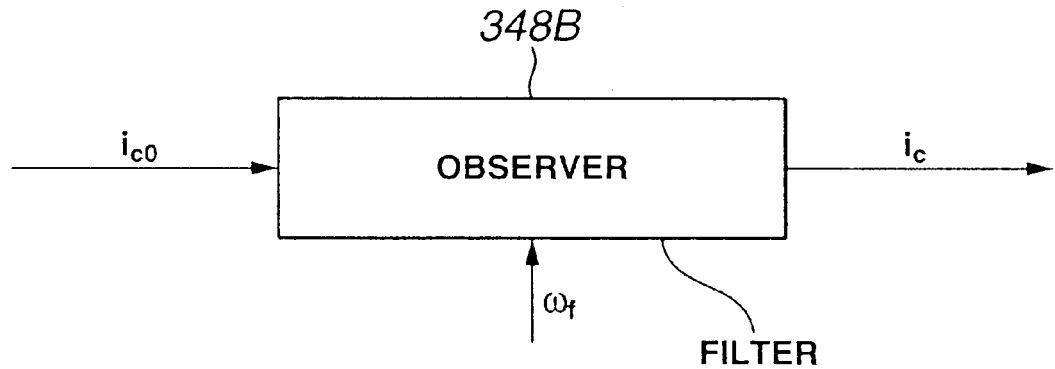
FIG. 7 is a portion of a control diagram of a CVT controller using an estimator as a filter.
Figure 8:
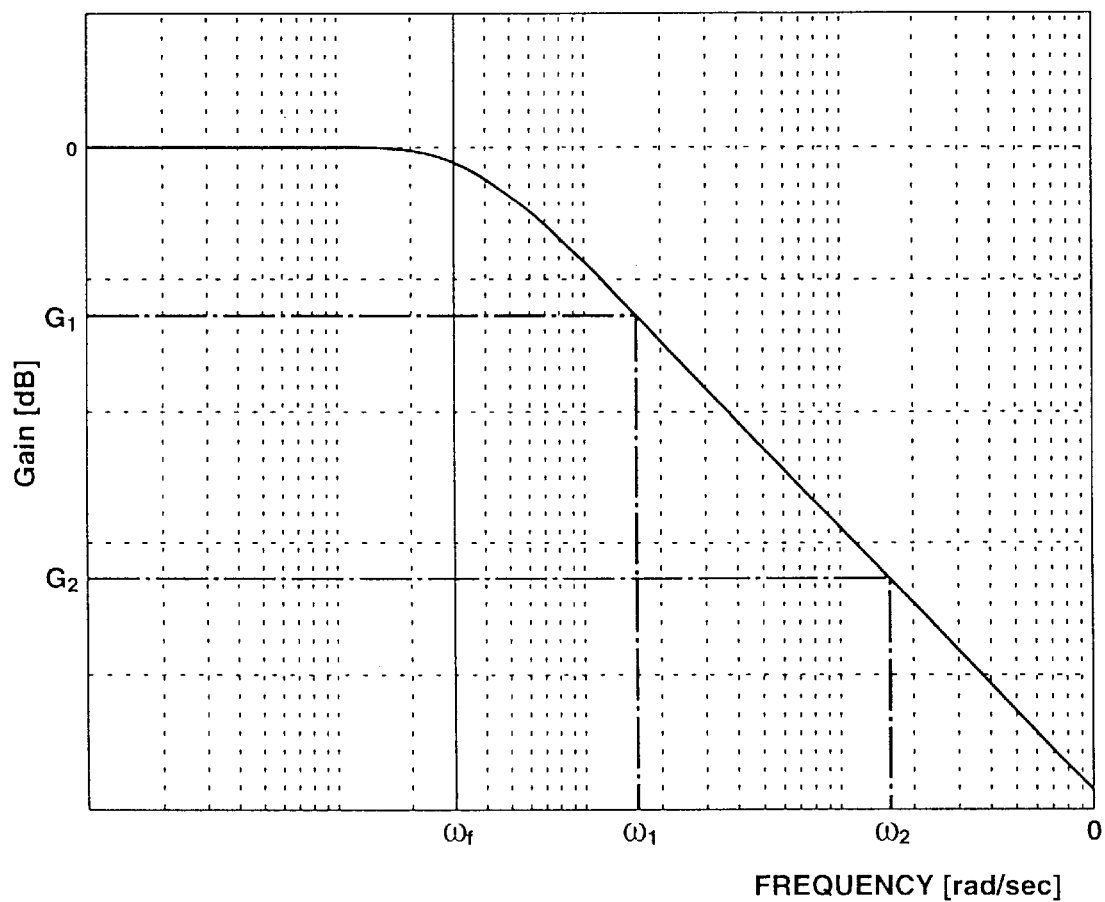
FIG. 8 is a low pass filter characteristic of the estimator from a measured value of trunnion angular position to an estimated value of trunnion angular position.
Figure 9:
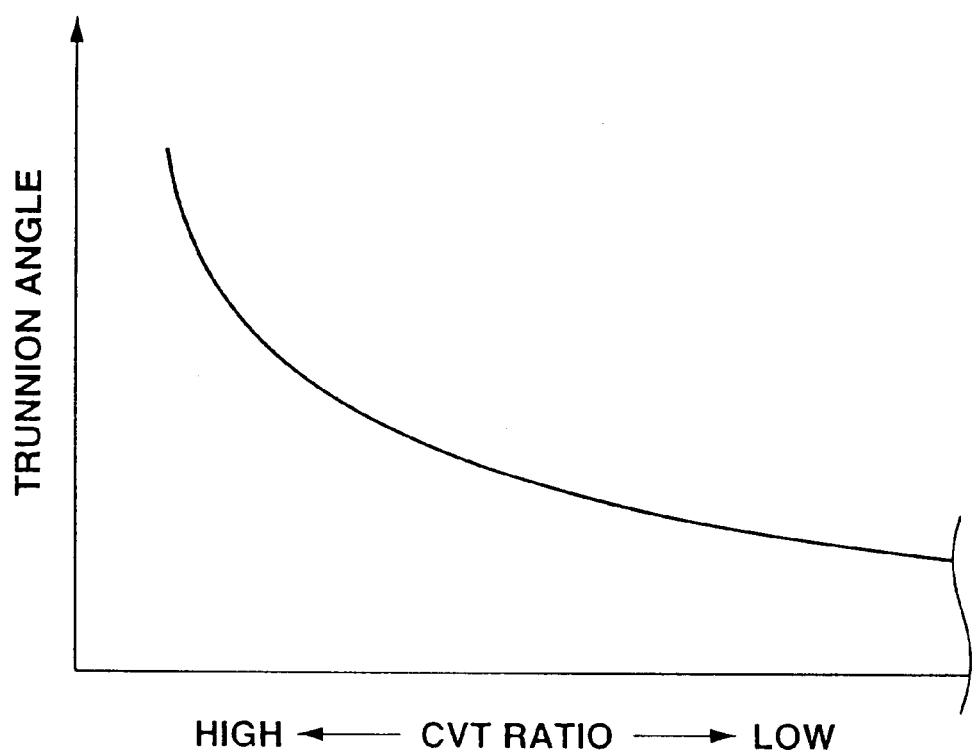
FIG. 9 is a conversion table between trunnion angular position and CVT ratio used to convert a measured value of CVT ratio to a measured value of trunnion angular position and to convert an estimated value of trunnion angular position to an estimated value of CVT ratio.

With reference now to FIGS. 7 and 8, the measured value $i_{cO}$ is converted into a measured value of trunnion angular position $\phi$ using the look-up table shown in FIG. 9. The measured value of trunnion angular position $\phi$ is used as input to an observer of the filter 348B. This observer provides an estimated value $\hat{\phi}$ of trunnion angular position. This estimated value $\hat{\phi}$ is converted into an estimated value $i_c$ of CVT ratio using the look-up table shown in FIG. 9. The filter 348B outputs the estimated value $i_c$ of CVT ratio.

Prior to further description on the observer of the filter 348B, a mathematical model of the CVT 10 is explained. In this model, a motor steps rate v, i.e., the first time derivative of motor steps u, is used as the input, and a trunnion angular displacement $\phi$, a trunnion axial displacement y, and motor steps u are used as state indicative quantities. The mathematical model may be expressed as:

$$(x)'=Ax+Bu \tag{12}$$

where, $$x = \begin{bmatrix} \phi \\ y \\ u \end{bmatrix}, A = \begin{bmatrix} 0 & f & 0 \\ -a_1 g & -a_2 g & bg \\ 0 & 0 & 0 \end{bmatrix}, B = \begin{bmatrix} 0 \\ 0 \\ 1 \end{bmatrix}$$

g is a variable dependent on line pressure Pl, which variable is obtained from a look-up table, not shown, versus line pressure Pl;

$a_1$, $a_2$ and b are constants that are determined according to the mechanical specification of the CVT 10;

f is a time dependent variable determined depending upon the trunnion angular displacement $\phi$ and a speed of rotation of a CVT input shaft or a CVT output shaft or a CVT traction roller.

For example, using the measured value $\omega_{co}$ of CVT output shaft speed, the time dependent variable f may be expressed as:

$$f = \frac{\{1+\eta-\cos(2\theta-\phi)\cos(\theta-\phi)\}}{(1+\eta)R_0 \sin\theta} \tag{13}$$

where: $\eta$, $\theta$ and $R_0$ are constants that are determined according to the mechanical specification of the CVT 10.

In order to provide an estimated value of state quantity x of the CVT 10, the observer is used, which may be expressed as:

$$\dot{\hat{A}}=A\hat{x}+Bu+H(\phi-\hat{\phi}) \tag{14}$$

where: $\hat{x}=[\hat{\phi}\hat{y}\hat{u}]^T$;
$\hat{\phi}$ is an estimated value of trunnion angular position;
$\hat{y}$ is an estimated value of trunnion axial displacement;
$\hat{u}$ is an estimated value of the number of motor steps;
$H=[h_1\ h_2\ h_3]^T$, which is an observer gain that specifies the speed of estimation by the observer.

The matrix components of the observer gain H are defined as:

$$h_1=2\zeta_o\omega_f+\omega_f-a_2 g \tag{15}$$

$$h_2 = \frac{\omega_f^2 + 2\zeta_o\omega_f^2 - a_2 g(2\zeta_o\omega_f + \omega_f - a_2 g) - a_1 gf}{f} \tag{16}$$

$$h_3 = \frac{\omega_f^3}{bgf} \tag{17}$$

As mentioned before, the input to this observer is trunnion angular position $\phi$ that is found in the look-up table shown in FIG. 9 using the measured value $i_{co}$ of CVT ratio.

Subtracting both sides of the equation (14) from both sides of the equation (12) can give the dynamic characteristic of deviation e expressed as:

$$\ddot{e}+\dot{e}+\dot{1}=(A-HC)e \tag{18}$$

where: $e=x-\hat{x}$;
C is expressed as $$C=[1\ 0\ 0] \tag{19}$$

From the equation (18), we obtain its characteristic equation that is expressed as:

$$(S^2+2\zeta_o\omega_f S+\omega_f^2)(S+\omega_f)=0 \tag{20}$$

As shown in FIG. 8, the observer has a low band pass characteristic from trunnion angular displacement $\phi$ to the estimated value $\hat{\phi}$ of trunnion angular displacement. This observer should be used as a low pass filter of the filter 348B. As mentioned before, an estimated value $i_c$ of CVT ratio is obtained from the look-up table shown in FIG. 9 using the estimated value $\hat{\phi}$ of trunnion angular displacement.

The filter 348A uses the low pass filter $W_1$ and the filter 348B uses the observer that behaves as a low pass filter. Cutoff frequency $\omega_f$ of such low pass filters is determined at a filter and command generator manager that will be described later.

Figure 10:
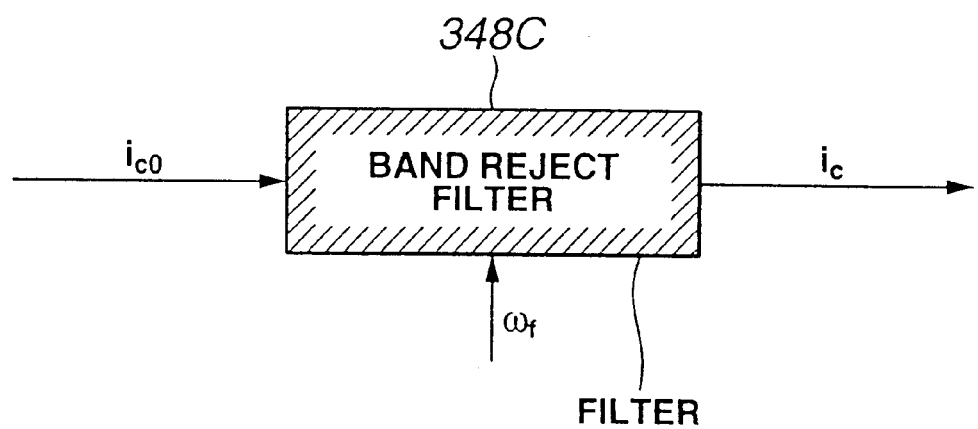
FIG. 10 is a portion of a control diagram of a CVT controller using a band reject filter.
Figure 12:
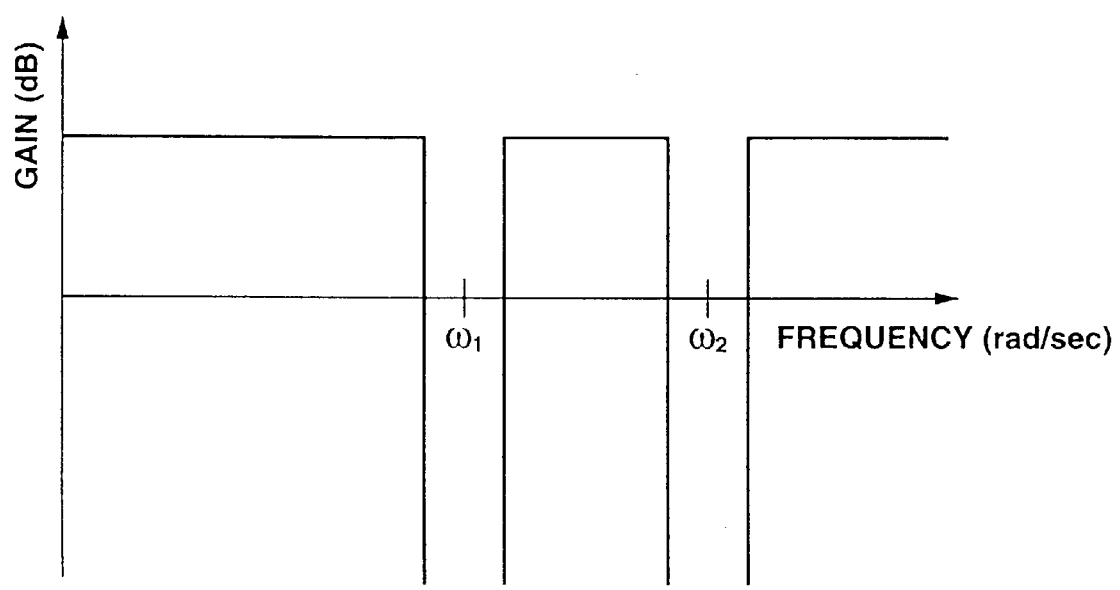
FIG. 12 is a gain vs., frequency characteristic of the band reject filter designed for eliminating noise shown in FIG. 10.

With reference now to FIGS. 10–12, the filter 348C uses a band reject filter or notch filter instead of the low pass filters. In this case, the band reject filter has reject bands to reject signal at the frequencies $\omega_1$ and $\omega_2$ of noise estimated at the noise estimator 346. FIG. 11 illustrates the noise estimated by the noise estimator 346. FIG. 12 illustrates a gain vs., frequency of the band reject filter that has reject bands at the frequencies $\omega_1$ and $\omega_2$ of noise estimated. Using such band reject filter or notch filter, the filter 348C processes the measured value $i_{co}$ of CVT ratio to give an estimated value $i_c$ of CVT ratio. As mentioned before, the frequency $\omega_1$ of noise is proportional to the measured value $\omega_{ci}$ of CVT input shaft speed. The lower the measured value $\omega_{ci}$ of CVT input shaft speed, the lower the frequency $\omega_1$. The reject band of frequencies is lowered as the CVT input shaft speed drops to eliminate the noise at the frequency $\omega_1$. The frequency $\omega_2$ of noise is proportional to the measured value $\omega_{co}$ of CVT output shaft speed. The reject band of frequencies is lowered as the CVT output shaft speed drops to eliminate the noise at the frequency $\omega_2$.

Turning back to FIG. 7, the measured value $i_{cO}$ of CVT ratio is used as the single input to the observer used in the filter 348B, and the observer can provide an estimated value $i_c$ of CVT ratio. In an exemplary embodiment, in addition to the measured value $i_{cO}$ of CVT ratio, an actuator command, such as a motor steps rate v or motor steps u, is used as another input to the observer used in the filter 348B. Using the actuator command as the input, the observer can estimate not only the CVT ratio but also trunnion axial displacement. In this case, the provision of a trunnion axial displacement sensor is no longer needed, leading to reduction in manufacturing cost. Besides, the trunnion axial displacement can be estimated with excellent accuracy, making it possible to maintain a precision required value of CVT ratio.

With continuing reference to FIG. 4, a command generator 350 is provided. The estimated value $i_c$ of CVT ratio and the desired value $i_c^*$ of CVT ratio are used as inputs to the command generator 350. The command generator 350 determines an actuator command such that the actuator command remains unaltered when a deviation of the estimated value $i_c$ of CVT ratio from the desired value $i_c^*$ of CVT ratio stays within a dead zone. In one exemplary embodiment to be explained later in connection with FIG. 15, the command generator 350 determines a motor steps rate v as the actuator command. The command generator 350 applies the motor steps rate v to the actuator, in the form of stepper motor 188, of the CVT 10. In another exemplary embodiment to be explained later in connection with FIG. 16, a command generator 350A determines motor steps u as the actuator command. The command generator 350A applies the motor steps u to the stepper motor 188 of the CVT 10.

Figure 15:
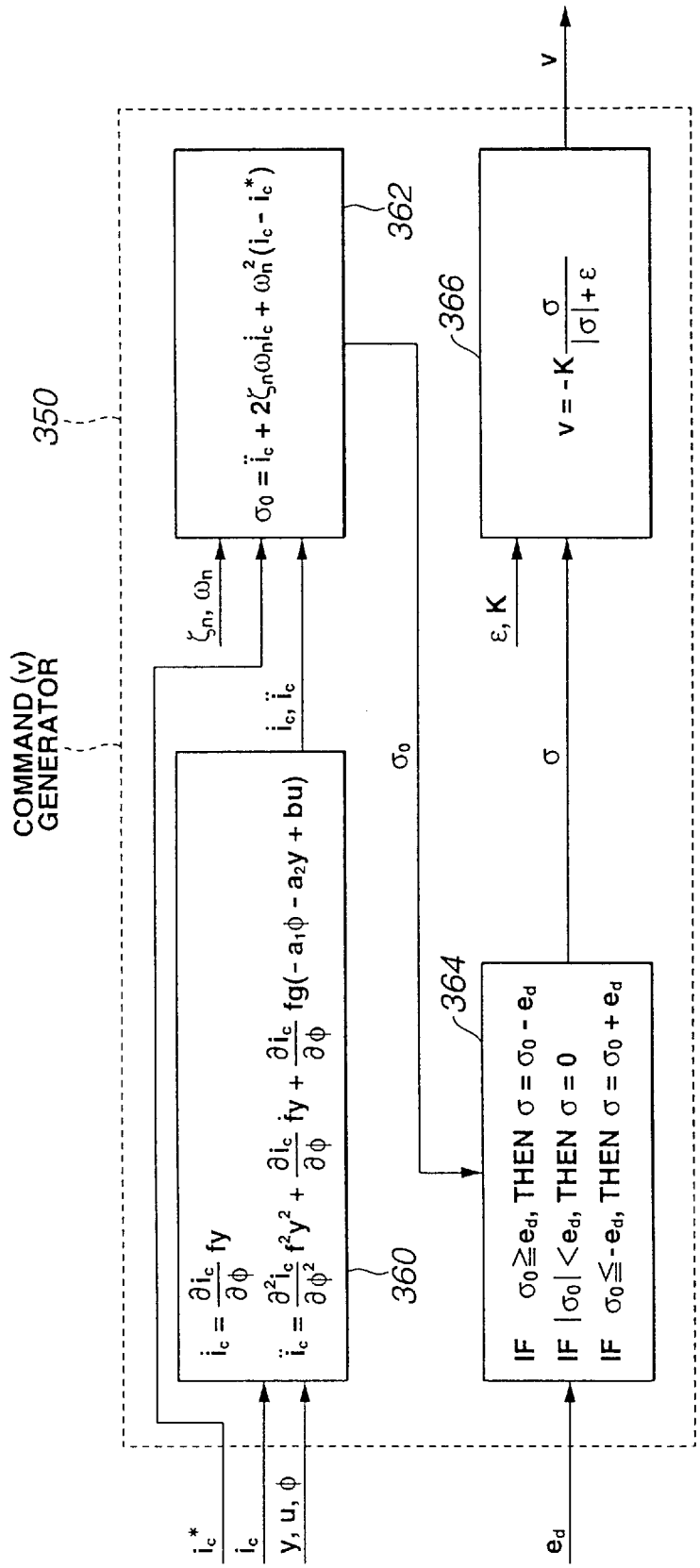
FIG. 15 is a control diagram of a command generator of a CVT controller.

With reference now to FIG. 15, the command generator 350 is designed to maintain a predetermined response characteristic of the estimated value $i_c$ of CVT ratio to a change in the desired value $i_c^*$ of CVT ratio. The estimated value $i_c$ is used as input to a box 360. The estimated value $i_c$ is converted to an estimated value of trunnion angular position $\phi$ using the look-up table in FIG. 9. In addition to the estimated value $i_c$ of CVT ratio, the estimated value of trunnion angular position $\phi$, trunnion axial displacement y, and motor steps u are used as other inputs to a box 360. At box 360, the first and second derivatives of CVT ratio $\dot{i}_c$ and $\ddot{i}_c$ are given by the following partial differential equations.

$$\dot{i}_c = \frac{\partial i_c}{\partial \phi} f y \quad (21)$$

$$\ddot{i}_c = \frac{\partial^2 i_c}{\partial \phi^2} f^2 y^2 + \frac{\partial i_c}{\partial \phi} \dot{f} y + \frac{\partial i_c}{\partial \phi} f g(-a_1 \phi - a_2 y + bu) \quad (22)$$

where:

$$\frac{\partial i_c}{\partial \phi} \text{ and } \frac{\partial^2 i_c}{\partial \phi^2}$$

are found in maps, not shown, using the estimated value of trunnion angular position $\phi$;

$\dot{f}$ is expressed by the following partial differential equation;

$$\dot{f} = \frac{\partial f}{\partial \phi} f y + \frac{\partial f}{\partial \omega_{co}} \omega_{co} \quad (23)$$

$$\frac{\partial f}{\partial \phi} \text{ and } \frac{\partial f}{\partial \omega_{co}}$$

are found in maps, not shown, using the estimated value of trunnion angular position $\phi$.

In the equation (23), the second term $$\frac{\partial f}{\partial \omega_{co}} \omega_{co}$$

on the right side may be negligibly small and thus regarded as 0 (zero) because a change in the measured value $\omega_{co}$ is very slow.

The desired value $i_c^*$ of CVT ratio, estimated value $i_c$ of CVT ratio, and the first and second derivative of CVT ratio $\dot{i}_c$ and $\ddot{i}_c$ are used as inputs to a box 362. At box 362, a control error $\sigma_0$ is determined. The control error $\sigma_0$ is an error between the actual response of the actual CVT ratio to a change in the desired CVT ratio and a desired response. The control error $\sigma_0$ is expressed as:

$$\sigma_0 = \ddot{i}_c + 2\zeta_n$$

$$\omega_{n+e,dot} \dot{i} + ee_c + \omega n^2$$

$$(i_c - i_c^*) \quad (24)$$

where: $\zeta_n$ is the damping coefficient of desired response; $\omega_n$ is the natural frequency.

The control error $\sigma_0$ and a dead zone expressed in terms of a deviation $e_d$ are used as inputs to a box 364. At box 364, the control error $\sigma_0$ is processed to give a processed control error $\sigma$ by performing control logic as follows:

If $\sigma_0 \geq e_d$, then $\sigma = \sigma_0 - e_d$

If $|\sigma_0| < e_d$, then $\sigma = 0$

If $\sigma_0 \leq -e_d$, then $\sigma = \sigma_0 + e_d$

The processed control error $\sigma$ is used as input to a box 366. At box 366, a motor steps rate v is determined as the actuator command. The motor steps rate v is expressed as:

$$v = -K \frac{\sigma}{|\sigma| + \varepsilon} \quad (25)$$

where: $\varepsilon$ is a positive constant that provides continuity of relationship of v with respect to $\sigma$ when $\sigma$ is in the neighborhood of 0 (zero);

K is the maximum speed at which the stepper motor 188 can operate.

Figure 16:
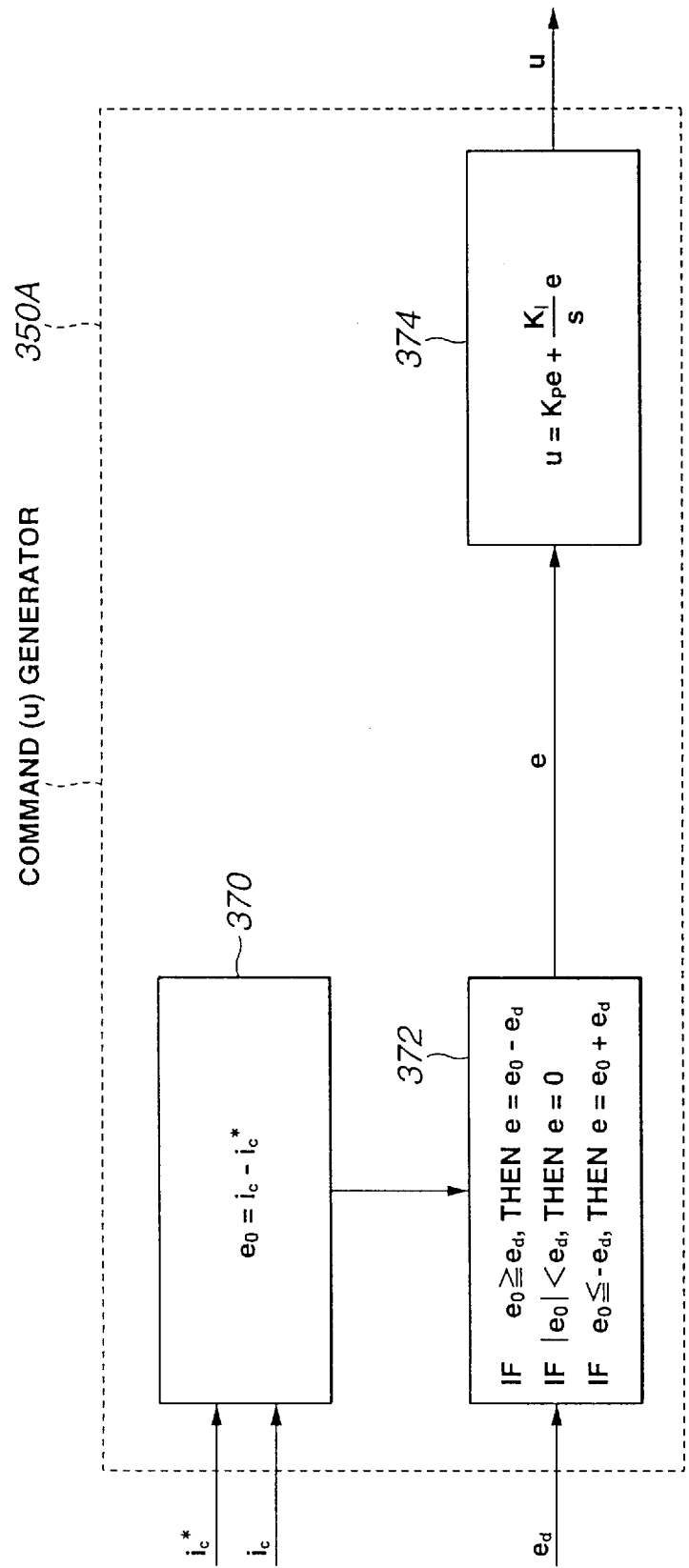
FIG. 16 is a control diagram of another command generator of a CVT controller.

With reference next to FIG. 16, another example of command generator designated at 350A is explained. As different from the command generator 350 shown in FIG. 15, the command generator 350A determines motor steps u. The estimated value $i_c$ of CVT ratio and the desired value $i_c^*$ of CVT ratio are used as inputs to a box 370. At box 370, a deviation $e_0$ between $i_c$ and $i_c^*$ ($e_0 = i_c - i_c^*$) is determined.

The deviation $e_0$ and a dead zone expressed in terms of a deviation $e_d$ are used as inputs to a box 372. At box 372, the deviation $e_0$ is processed to give a processed deviation e by performing control logic as follows:

If $e_0 \geq e_d$, then $e = e_0 - e_d$
If $|e_0| < e_d$, then $e = 0$
If $e_0 \leq -e_d$, then $e = e_0 + e_d$ The processed deviation e is used as input to a box 374. At box 374, motor steps u is determined as the actuator command. The motor steps u is expressed as:

$$u = K_P e + \frac{K_I}{s} e \qquad (26)$$

where: $K_p$ is the proportional gain;
$K_I$ is the integral gain;
s is the Laplacian.

With reference back to FIG. 4, a filter and command generator manager 352 is provided. The filter and command generator manager 352 narrows the dead zone $e_d$ to meet precision requirement upon determination that the desired value $i_c^*$ of CVT ratio has been accomplished. Besides, the filter and command generator manager 352 adjusts the filter 348 to gain requirement for keeping the magnitude of signal at frequency of noise within the narrowed dead zone.

In the exemplary embodiment, the precision required CVT ratio generator 344 outputs the largest and smallest values $i_{cl}$ and $i_{ch}$ of CVT ratio as examples of a precision required value of CVT ratio. The precision required value, $i_{cl}$ or $i_{ch}$, for example, and the desired value $i_c^*$ are used as inputs to the filter and command generator manager 352 for determination whether or not there is precision requirement that the precision required value, $i_{cl}$ or $i_{ch}$, for example, be held with excellent precision. In the embodiment, the filter and command generator manager 352 determines that the precision requirement exists when the desired value $i_c^*$ of CVT ratio and the precision required value $i_{cl}$ or $i_{ch}$ match with each other.

When a need remains to meet the precision requirement, the filter and command generator manager 352 determines whether or not the desired value $i_c^*$ has been accomplished. In the embodiment, for example, it is determined that the desired value $i_c^*$ has been accomplished when the estimated value $i_c$ of CVT ratio and the desired value $i_c^*$ match with each other.

As mentioned before, the filter and command generator manager 352 narrows the dead zone $e_d$ to meet the precision requirement upon determination that the desired value $i_c^*$ of CVT ratio has been accomplished. This situation continues until the precision requirement disappears. Immediately after the precision requirement has disappeared or when the precision requirement does not exist, the filter and command generator manager 352 reinstates the dead zone $e_d$, so that the dead zone $e_d$ is wide enough to permit ratio change without hunting. In the embodiment, the dead zone $e_d$ is given by summing the magnitudes of noise $i_{cp}\alpha_1$ and $i_{cp}\alpha_2$ when there is no precision requirement.

In coordination with the dead zone $e_d$ wide enough to permit ratio change without hunting, the filter and command generator manager 352 adjusts the filter 348 to gain requirement for keeping good response characteristic by minimizing a delay of a change in the estimated value $i_c$ of CVT ratio to a change in the measured value $i_{c0}$ of CVT ratio. In the case, the low pass filter, which exhibits the gain vs., frequency characteristic shown in FIG. 6, is used or the observer, which exhibits the gain vs., frequency characteristic shown in FIG. 8 is used, the filter and command generator manager 352 selects a sufficiently high frequency as the cutoff frequency $\omega_f$ to meet the gain requirement.

Figure 14:
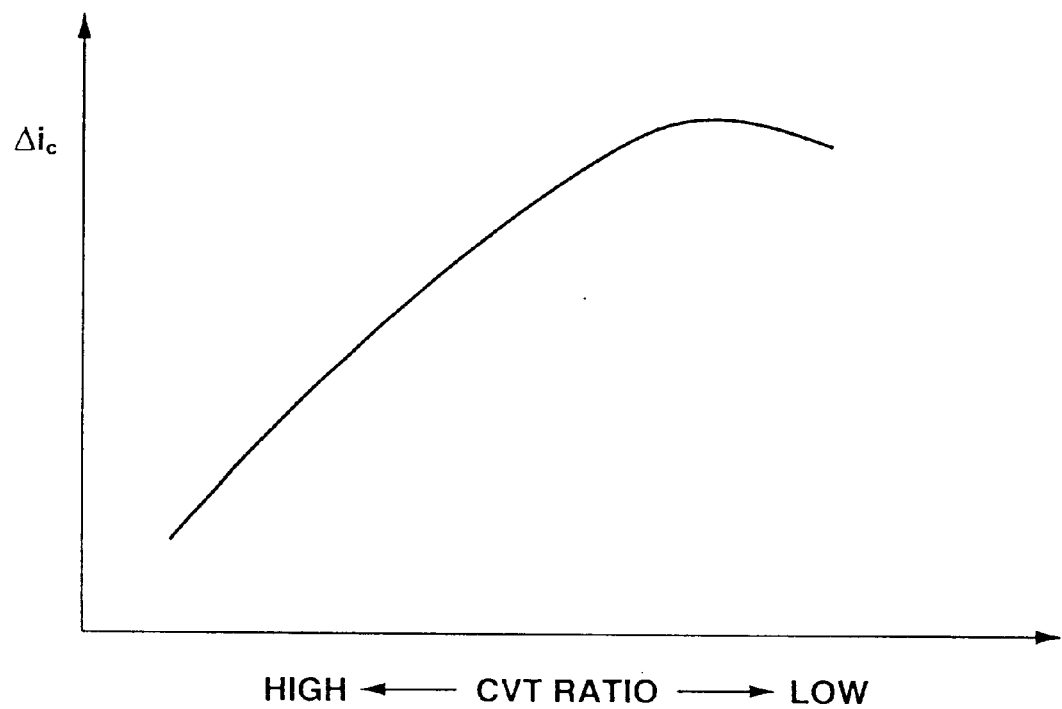
FIG. 14 is a look-up table illustrating various CVT ratio intervals determined by resolution of an actuator in the form of a stepper motor at different CVT ratios.

In the embodiment, when the estimated value $i_c$ of CVT ratio and the desired value $i_c^*$ of CVT ratio match with each other after the desired value $i_c^*$ of CVT ratio and the precision required value $i_{cl}$ or $i_{ch}$ of CVT ratio have matched with each other, the filter and command generator manager 352 sets the narrowed dead zone $e_d$. The filter and command generator manager 352 finds a value of CVT ratio interval $\Delta i_c$ versus the measured value $i_{c0}$ of CVT ratio or the estimated value $i_c$ of CVT ratio from a look-up table shown in FIG. 14. The filter and command generator manager 352 uses the value of CVT ratio interval $\Delta i_c$ in determining the narrowed dead zone $e_d$. The look-up table shown in FIG. 14 provides a CVT ratio interval $\Delta i_c$ that is determined by the resolution of the stepper motor 188 at a CVT ratio.

In coordination with the narrowed dead zone $e_d$, the filter and command generator manager 352 adjusts the filter 348 to gain requirement for keeping the magnitude of signal at frequency of noise within the narrowed dead zone $e_d$. In the case, the low pass filter, which exhibits the gain vs., frequency characteristic shown in FIG. 6, is used or the observer, which exhibits the gain vs., frequency characteristic shown in FIG. 8 is used, the filter and command generator manager 352 selects a sufficiently low frequency as the cutoff frequency $\omega_f$ to meet the gain requirement. With the cutoff frequency $\omega_f$ set at such low frequency, the low pass filter 348 or 348A or 348B provides, at frequencies of noise $\omega_1$ and $\omega_2$, gains $G_1$ and $G_2$ low enough, as shown in FIG. 6 or 8, to suppress level of noise contained in the estimated value $i_c$ of CVT ratio to a sufficiently low level.

As is readily understood from FIG. 6 or 8, the cutoff frequency $\omega_f$ of a low pass filter determines gains $G_1$ and $G_2$ at frequencies of noise $\omega_1$ and $\omega_2$. As shown in FIG. 11, the magnitudes of noise at frequencies $\omega_1$ and $\omega_2$ are $i_{cp}\alpha_1$ and $i_{cp}\alpha_2$, respectively, according to the calculation at the noise estimator 346. Keeping the signal at the frequencies $\omega_1$ and $\omega_2$ within the narrowed dead zone $e_d$ must hold the following relationship.

$$e_d > i_{cp}(\alpha_1 G_1 + \alpha_2 G_2) \qquad (27)$$

The frequency of cutoff frequency $\omega_f$ should be set to hold the relationship as expressed by the formula (27).

The formula (27) clearly tells that narrowing the dead zone $e_d$ demands reductions in the magnitudes of gains $G_1$ and $G_2$ to keep the signal at frequencies of noise $\omega_1$ and $\omega_2$ within the narrowed dead zone $e_d$. This causes the standing deviation, if any, to shrink sufficiently.

The formula (27) also tells that increasing of pure value $i_{cp}$ of CVT ratio demands reduction in the magnitudes of gains $G_1$ and $G_2$ at the frequencies of noise $\omega_1$ and $\omega_2$. The pure value $i_{cp}$ of CVT ratio increases as the actual CVT ratio within the CVT 10 shifts down. What is needed to cope with this situation is to lower the cutoff frequency $\omega_f$ so as to reduce the magnitudes of gains $G_1$ and $G_2$ at the frequencies of noise $\omega_1$ and $\omega_2$.

In the above description, the cutoff frequency $\omega_f$ of a low pass filter only has been relied upon to reduce the magnitude of gains $G_1$ and $G_2$ at the frequencies of noise $\omega_1$ and $\omega_2$. In the case the low pass filter $W_1$ that is expressed as the equation (11) is used, increasing the exponent n causes reductions in the magnitudes of gains $G_1$ and $G_2$ at the frequencies of noise $\omega_1$ and $\omega_2$ as readily seen from FIG. 6.

Accounting for the case where the actual noise contained in the measured value $i_{c0}$ of CVT ratio exceeds the estimates $i_{cp}\alpha_1$ and $i_{cp}\alpha_2$ has caused the filter and command generator manager 352 to reduce a control gain at the command generator 350 upon determination that the desired value $i_c^*$ of CVT ratio has been accomplished after the desired value $i_c^*$ of CVT ratio and the precision required value $i_{cl}$ (or $i_{ch}$) have matched with each other. Reducing the control gain causes a delay in response rate of a change in the estimated value $i_c$ of CVT ratio to a change in the desired value $i_c^*$ of CVT ratio, effectively suppressing vibration of CVT ratio due to noise. With reference to FIG. 15, the term $\omega_n$ (see box 362) or $\epsilon$ (see box 366) or K (see box 366) may be varied to reduce the control gain at the command generator 350.

Figure 17:
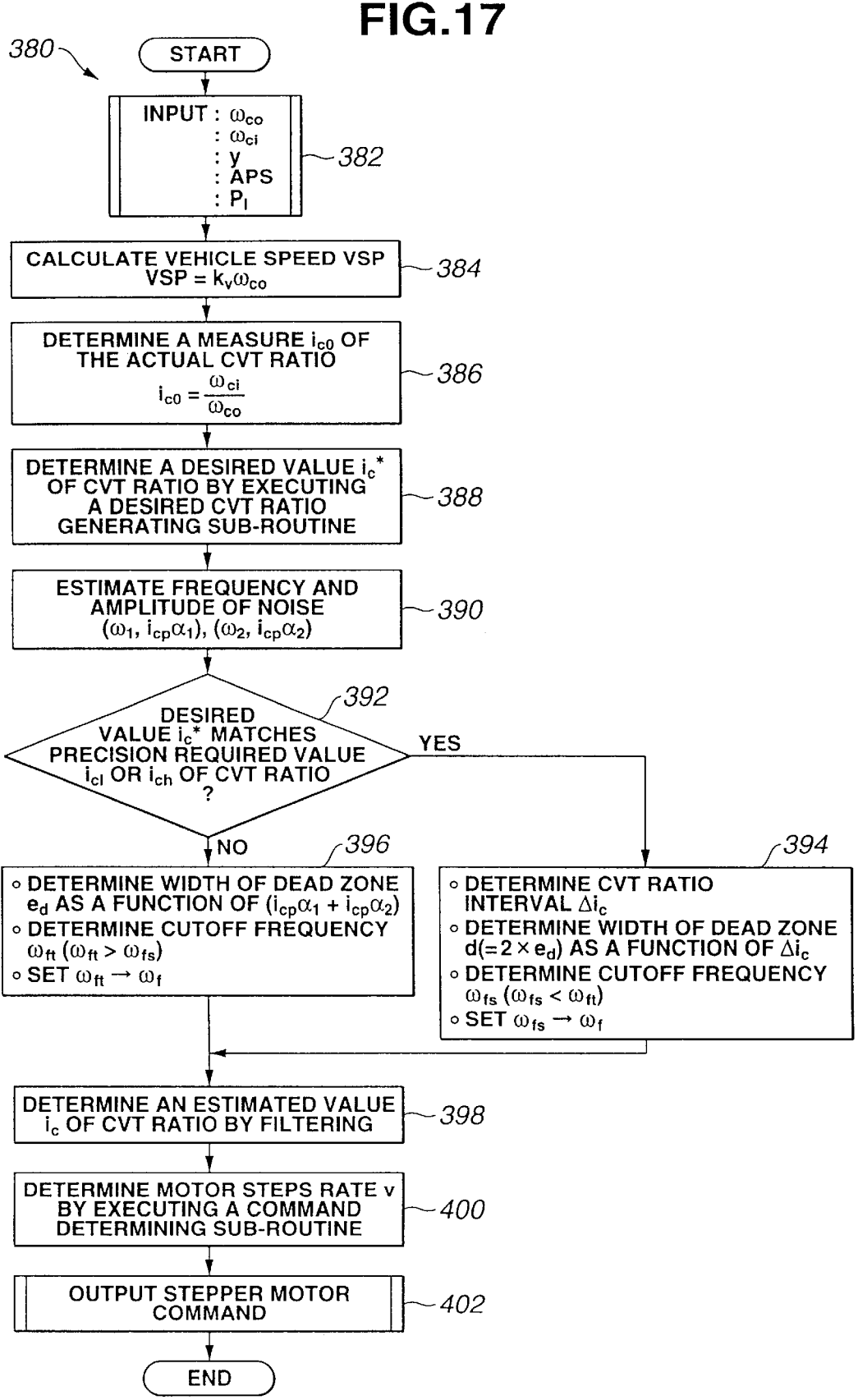
FIG. 17 is a flow chart of a control routine implementing the present invention.

The flow chart in FIG. 17 illustrates a control routine 380 of the preferred implementation of the present invention. The microprocessor 302 of CVT controller 300 (see FIG. 3) repeats execution of the control routine 380 at regular interval of, for example, 10 milliseconds. At input box 382, the controller inputs information of measured value $\omega_{co}$ of CVT output shaft, measured value $\omega_{ci}$ of CVT input shaft, trunnion axial displacement y, accelerator pedal position (or depression) APS and line pressure Pl.

At box 384, the controller calculates vehicle speed VSP ($=k_v\omega_{co}$). At box 386, the controller determines a measured value $i_{c0}$ of CVT ratio by dividing $\omega_{ci}$ by $c_{co}$. At box 388, the controller determines a desired value $i_c^*$ of CVT ratio by executing a desired CVT ratio generating sub-routine to be described later in connection with FIG. 18. At box 390, the controller estimates frequencies of noise and the amplitudes at the frequencies ($\omega_1$, $i_{cp}\alpha_1$) and ($\omega_2$, $i_{cp}\alpha_2$).

At interrogation box 392, the controller determines whether or not the estimated value $i_c$ of CVT ratio and the desired value $i_c^*$ of CVT ratio match with each other after the desired value $i_c^*$ of CVT ratio and the precision required value $i_{cl}$ or $i_{ch}$ of CVT ratio have matched with each other. If this is the case, the control logic goes to box 394. If this is not the case, the control logic goes to box 396.

At box 394, the controller determines the CVT ratio interval $\Delta i_c$ from the look-up table shown in FIG. 14. The controller determines width of dead zone d ($=2\times e_d$) as a function of the CVT ratio interval $\Delta i_c$. The controller determines a cutoff frequency $\omega_{fs}$ and sets the determined frequency $\omega_{fs}$ as a cutoff frequency $\omega_f$ of an observer that exhibits a low pass filter characteristic as shown in FIG. 8.

At box 396, the controller determines dead zone $e_d$ as a function of sum ($i_{cp}\alpha_1+i_{cp}\alpha_2$). The controller determines a cutoff frequency $\omega_{ft}$ ($\omega_{ft}>\omega_{fs}$) and sets the determined frequency $\omega_{fs}$ as a cutoff frequency $\omega_f$ of an observer that exhibits a low pass filter characteristic as shown in FIG. 8.

After setting dead zone and cutoff frequency at box 394 or 396, the control logic goes to box 398. At box 398, the controller computes the observer that has been explained before in connection with FIGS. 7 and 8 to process or filter the measured value $i_{c0}$ of CVT ratio thereby to determine an estimated value $i_c$ of CVT ratio.

At box 400, the controller determines motor steps rate v by executing a command determining sub-routine to be described later in connection with FIG. 19.

At output box 402, the controller outputs the determined motor steps rate v as stepper motor command.

Figure 18:
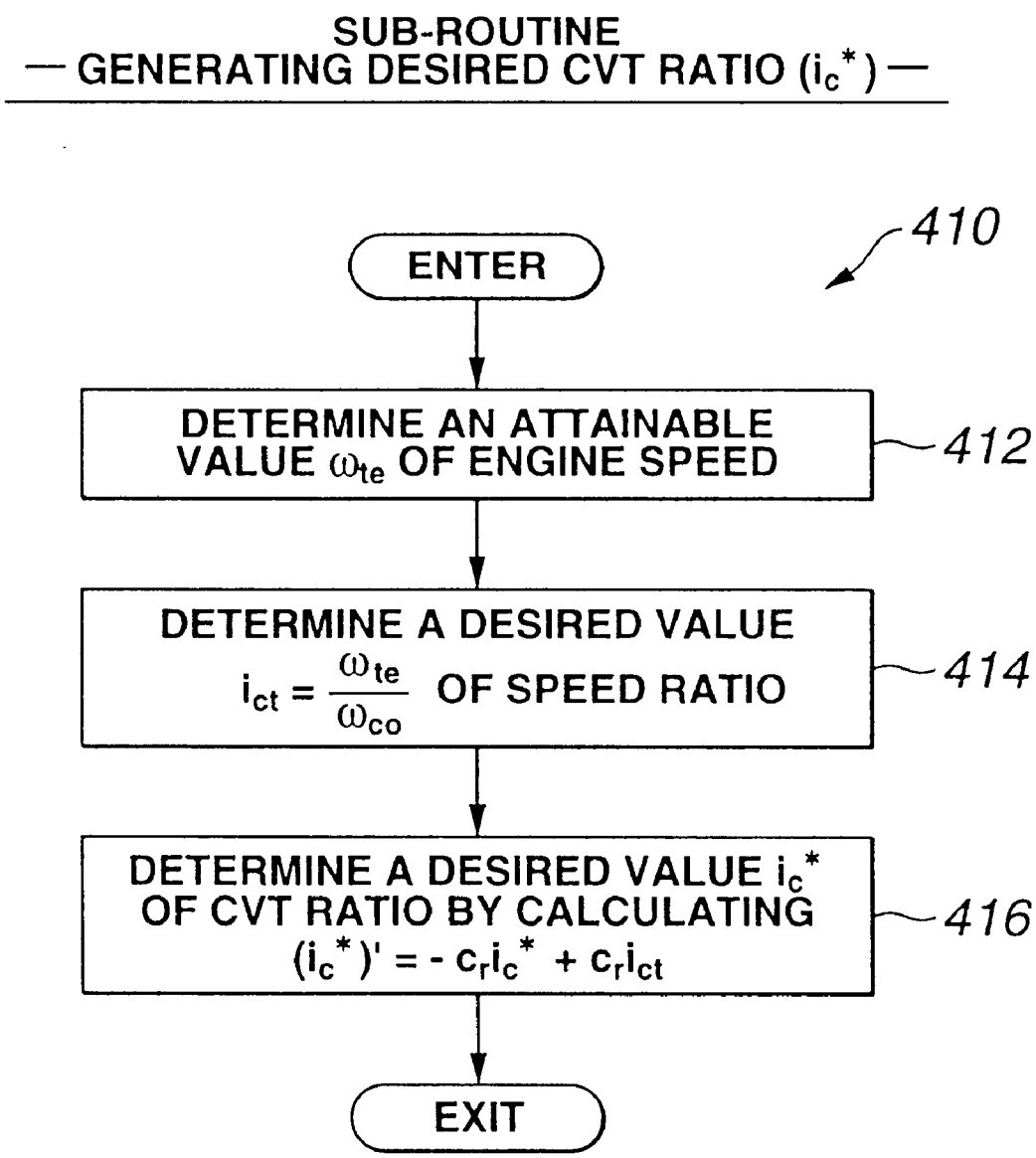
FIG. 18 is a flow chart of a sub-routine.

The flow chart in FIG. 18 illustrates the desired CVT ratio generating sub-routine now generally designated at 410. At box 412, the controller determined a desired or attainable value $\omega_{te}$ of engine speed from the look-up map shown in FIG. 13. At box 414, the controller determines a desired value $i_{ct}$ of speed ratio by dividing $\omega_{te}$ by $\omega_{co}$. At box 416, the controller determines the desired value $i_c^*$ by calculates the filter expressed as $(i_c^*)'=-c_r i_c^* + c_r i_{ct}$.

Figure 19:
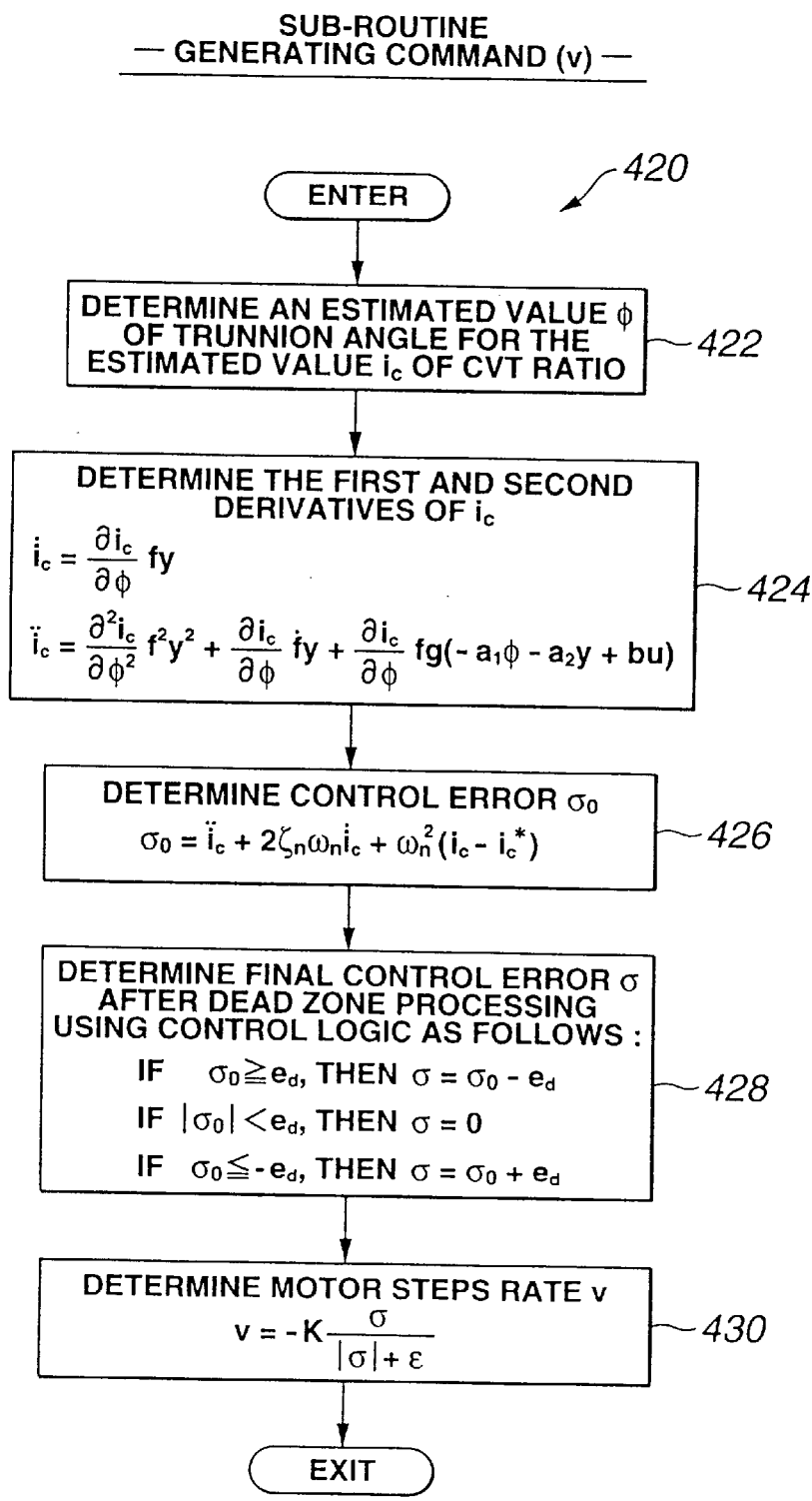
FIG. 19 is a flow chart of a sub-routine.

The flow chart in FIG. 19 illustrates the command determining sub-routine now generally designated at 420. At box 422, the controller determines an estimated value of trunnion angle $\phi$ from the look-up table shown in FIG. 9. At box 424, the controller determines the first and second derivatives of the estimated value $i_c$ of CVT ratio by calculating the partial differential equations (21) and (22). At box 426, the controller determines a control error $\sigma_0$ by calculating the equation (24). At box 428, the controller determines a processed or a final control error $\sigma$ by conducting control logic as follows:

If $\sigma_0 \geq e_d$, then $\sigma=\sigma_0-e_d$
If $|\sigma_0|<e_d$, then $\sigma=0$
If $\sigma_0 \leq -e_d$, then $\sigma=\sigma_0+e_d$ At box 430, the controller determines motor steps rate v by calculating the equation (25).

Figure 20:
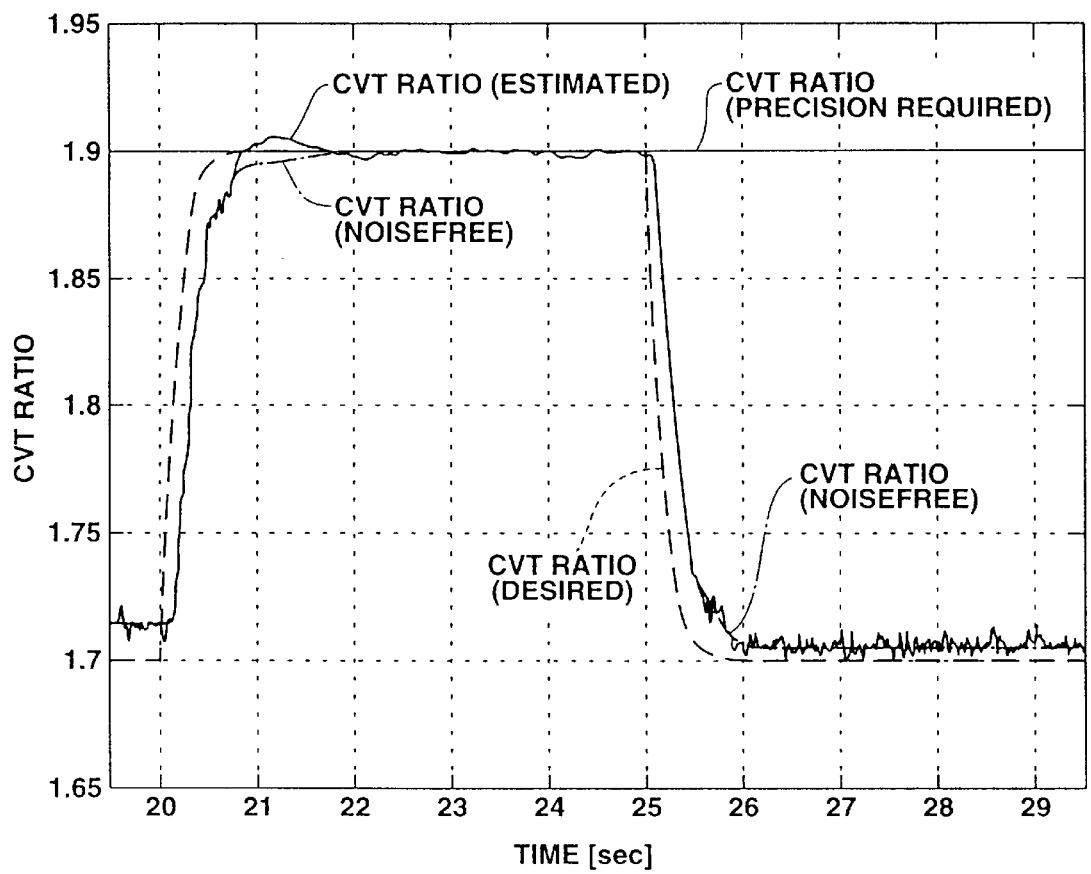
FIG. 20 is a simulation result confirming the effectiveness of the present invention.

FIG. 20 is a simulation result of confirming the effectiveness of the embodiment according to the present invention. The desired value $i_c^*$ of CVT ratio was changed from a value of 1.7 to another value of 1.9, which is a precision required value $i_{cl}$ of CVT ratio, and then back to the value of 1.7. The width of ordinary wide dead zone was 0.02, and the width of narrowed dead zone was 0.002. The result clearly shows that standing deviation is considerably large at the value of 1.7. It also clearly shows that, at the value of 1.9, standing deviation is small and negligible, so that the precision required value of CVT ratio is held with excellent precision.

Figure 21:
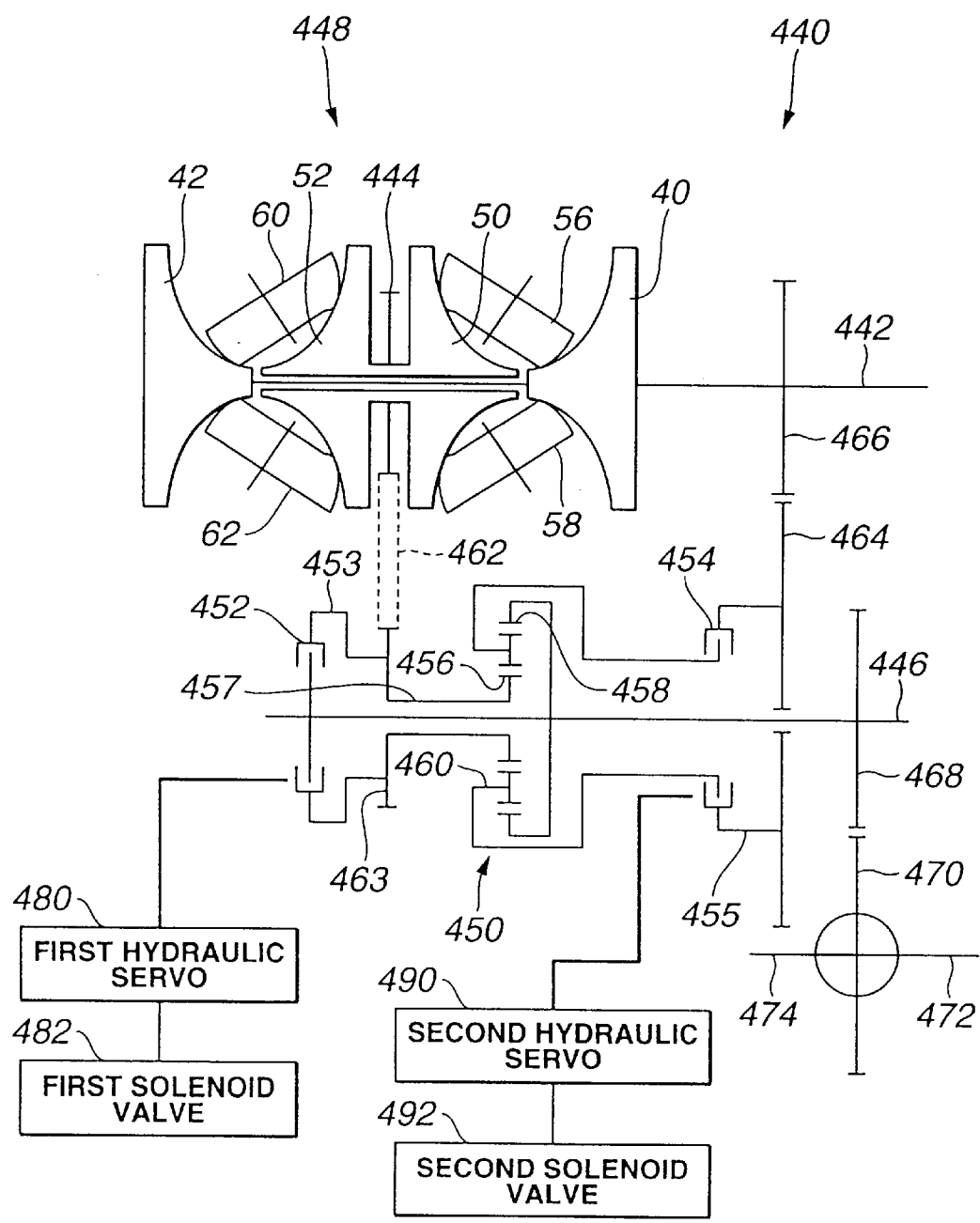
FIG. 21 is a schematic diagram a CVT including a dual cavity toroidal drive and a planetary gearing to form an infinitely variable transmission (IVT).
Figure 22:
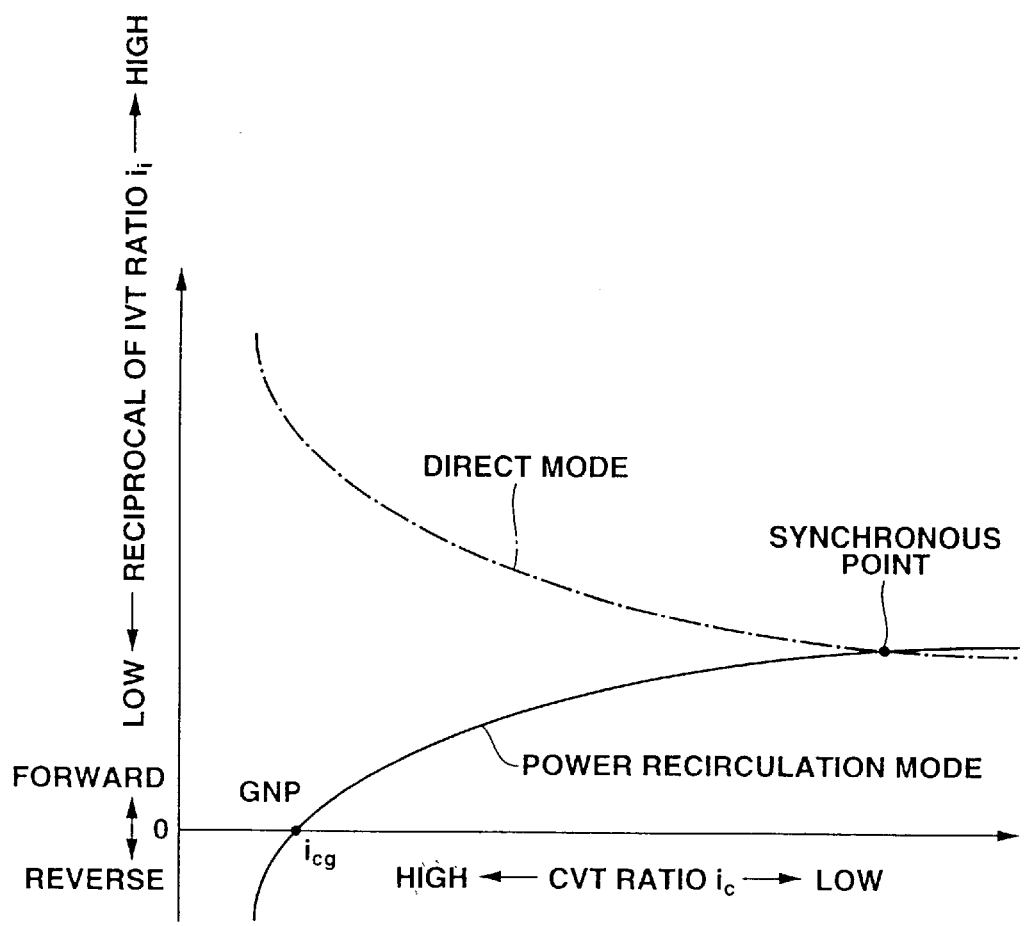
FIG. 22 is a map illustrating a direct mode and a power recirculation mode.

With reference now to FIGS. 21 and 22, it is described that the present invention may be implemented in a CVT that is configured to form an infinitely variable transmission (IVT).

FIG. 21 is a schematic diagram of the IVT, which is substantially the same as the structure shown in FIG. 1 of and described in the commonly assigned U.S. Pat. No. 6,351,700 B1, Muramoto et al., issued Feb. 26, 2002 or the commonly assigned U.S. Pat. No. 6,317,672 B1, Kuramoto et al., issued Nov. 13, 2001. Both of these two commonly assigned United States Patents have been incorporated herein by reference in their entirety.

In FIG. 21, the IVT is generally designated at 440. The IVT 440 comprises an IVT input shaft 442 to be driven by an engine, not shown, of a vehicle, and an IVT output shaft 446. A CVT includes a dual cavity toroidal drive 448. The dual cavity toroidal drive 448 is substantially the same as the dual cavity toroidal drive 12 except the provision of a chain sprocket 444 instead of the output gear 54. The chain sprocket 444 is fixedly connected to inboard output discs 50 and 52. Like reference numerals are used to designate like or similar parts in FIGS. 1 and 21. The input shaft 442 drives outboard input discs 40 and 42 of the dual cavity toroidal drive 448.

A planetary gearing 450 is connected to the output shaft 446. A direct clutch 452 and a power recirculation clutch 454 are provided. The planetary gearing 450 is a simple planetary gear set and includes a sun gear 456, a ring gear 458, and a pinion carrier 460. The pinion carrier 460 supports a plurality of pinions, each being in mesh engagement between the sun and ring gears 456 and 458.

An input gear 466 is fixedly coupled to the input shaft 442 for rotation therewith. The input gear 466 is in mesh with an output gear 464. The output gear 464 is mounted for relative rotation about the output shaft 446, and fixedly connected to a clutch drum 455 of the power recirculation clutch 454.

The ring gear 458 is fixedly connected to the output shaft 446 for rotation therewith. The sun gear 456 is fixedly connected to a chain sprocket 463 via a hollow sleeve 457 that is supported for relative rotation about the input shaft 446. The chain sprocket 463 is fixedly connected to a clutch drum 453 of the direct clutch 452. A chain 462 drivingly interconnects the chain sprockets 444 and 463.

The output shaft 446 has an output gear 468. The output gear 468 is in mesh with a final gear 470 of a deferential with a pair of axles 472 and 474.

The direct clutch 452 has a first hydraulic servo 480 and a first solenoid valve 482. The first solenoid valve 482 regulates hydraulic pressure applied to the first hydraulic servo 480. The hydraulic pressure determines a clutch engagement force, with which the direct clutch 452 is engaged. The power recirculation clutch 454 has a second hydraulic servo 490 and a second solenoid valve 492. The second solenoid valve 492 regulates hydraulic pressure applied to the second hydraulic servo 490. This hydraulic pressure determines a clutch engagement force, with which the power recirculation clutch 454 is engaged.

With reference to FIG. 22, the vertical axis represents the reciprocal of IVT ratio, and the horizontal axis represents CVT ratio. For operation in power recirculation mode, the clutches 454 and 452 are engaged and disengaged, respectively. For operation in direct mode, the clutches 454 and 452 are disengaged and engaged, respectively.

As is well known in the art of toroidal drive traction transmissions, pivoting of axles of traction rollers alters the CVT ratio. When the traction roller axles are in the positions, namely, low position, illustrated in FIG. 21, their associated traction rollers 56, 58, 60 and 62 make contact with their input discs 40, 42 at minimum radius and with their output disc 50, 52 at maximum radius: the CVT ratio is therefore the largest. At the other extreme, when the traction roller axles are in the positions, namely, high positions, not illustrated, the traction rollers 56, 58, 60 and 62 make contact with their input discs 40, 42 at maximum radius and with their output discs 50, 52 at minimum radius: the CVT ratio is therefore the smallest.

Assume that, with the clutches 454 and 452 are engaged and disengaged, respectively, the traction roller axles are in the high positions in which their associated traction rollers 56, 58, 60 and 62 make contact with their input discs 40 and 42 at maximum radius and with their output discs 50 and 52 at minimum radius. For a given speed of rotation of the IVT input shaft 442, the IVT output shaft 446 will be rotating at maximum speed in reverse direction. If now the inclination of the traction roller axles is progressively changed so that they move towards the opposite extreme of their angles of movement, the resultant of unchanging speed of pinion carrier 460 and diminishing speed of rotation of sun gear 456 will be a steady reduction in the resultant speed of rotation of ring gear 458 and so of shaft 446. A state will be reached, before the traction roller axles reach the opposite extreme of their angle, in which the speeds of rotation of pinion carrier 460 and sun gear 456 are such that the resultant speed of ring gear 458 and IVT output shaft 446 is zero and a condition known in the art as "geared neutral point (GNP)" is attained. In FIG. 22, the GNP is attained when the traction roller axles reach their angle in which a value of CVT ratio is $i_{cg}$. If the traction roller axles move toward and finally reach their extreme illustrated in FIG. 21, the speed of rotation of sun gear 456 continues to fall while that of rotation of pinion carrier 460 remains unchanged, and the ring gear 458 and IVT output shaft 446 accordingly rotate with increasing speed in the opposite direction, that is to say forward direction.

If the clutch 454 is disengaged and clutch 452 is engaged, then although sun gear 456 remains driven, pinion carrier 460 is freed from restraint and the sun gear 456 therefore transmits no drive. The IVT output shaft 446 is driven solely from the output discs 50, 52 by the chain 462. As is well known in the art, by appropriate choice of gearing and CVT ratios, it is possible to ensure that when the engagement of clutches 454 and 452 is reversed at the end of a period of operation in first regime, when the traction roller axles are in their illustrated positions in FIG. 21 and the IVT output shaft 446 is therefore rotating at the maximum forward speed of which it is capable in the first regime, the instantaneous forward speed at which the IVT output shaft 446 is driven as the second regime takes over is exactly the same. Such a change of regimes, resulting in no instantaneous change of IVT output shaft speed, is known as a "synchronous point" (see FIG. 22). If, following the adoption of second regime, the inclination of the traction roller axles is once again progressively changed, this time back towards the high position, the forward speed of the IVT output shaft 446 rises progressively to its maximum value.

In the embodiment, the present invention is implemented by using the above-mentioned value $i_{cg}$ of CVT ratio as the precision required value of CVT ratio. This embodiment is substantially the same as the previously described embodiments except the above-mentioned point. By holding the CVT ratio at the value $i_{cg}$ with excellent precision, zero speed of the IVT output shaft 446 at the GNP is maintained, enhancing control quality of the IVT.

This section provides description on the manner of determining the width d of a dead zone. The width d is defined as the double of $e_d$ ($d=2 \times e_d$) and must satisfy the following relationship.

$$d \geq A + m \tag{28}$$

where: A is the magnitude of noise and expressed as 2×(amplitude of noise), that is, $2 \times (i_{cp}\alpha_1 + i_{cp}\alpha_2)$;
m is the sum of minimum interval in CVT ratio that can be attained by the actuator (stepper motor) 188 and minimum interval in CVT ratio that can be measured by the measured CVT ratio generator 340.

The width $d_{min}$ of dead zone that can be narrowed at the filter and command generator manager 352 may be defined as:

$$d_{min} = A_{min} + m \tag{29}$$

where: $A_{min}$ is minimum width of noise resulting from processing at the filter 348.

Figure 23:
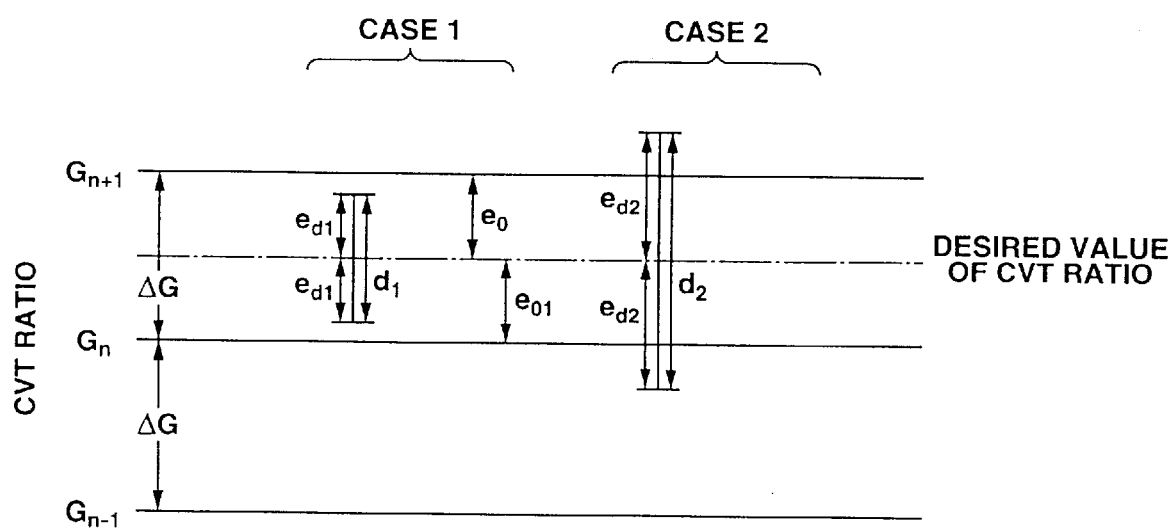
FIG. 23 is a diagram illustrating a case 1 wherein the width of dead zone about a desired value of CVT ratio is narrower than an interval ΔG between the two adjacent values of CVT ratio as well as a case 2 wherein the width of dead zone is wider than the interval ΔG.

With reference to FIG. 23, the cases 1 and 2 are illustrated. In FIG. 23, it is assumed that the adjacent two of CVT ratios $G_{n-1}$, $G_n$, $G_{n+1}$, . . . are equidistant at minimum interval $\Delta G$ that can be attained by the stepper motor 188. In the case 1, the width $d_1$ of dead zone ($d_1 = 2 \times e_{d1}$) about a desired value of CVT ratio is narrower than the interval $\Delta G$. In the case 2, the width $d_2$ of dead zone ($d_2 = 2 \times e_{d2}$) about a desired value of CVT ratio is wider than the interval $\Delta G$.

Assume that the current value of CVT ratio is $G_{n+1}$, a desired value of CVT ratio is between the values $G_{n+1}$ and $G_n$, and a deviation $e_0$ exists.

In the case 1, a shift to the value $G_n$ of CVT ratio takes place, remaining a deviation $e_{01}$ that is greater than $e_{d1}$, causing a shift back to the original value $G_{n+1}$. The hunting therefore takes place.

In the case 2, a shift to the value $G_n$ of CVT ratio takes place, remaining a deviation $e_{01}$. Since this deviation $e_{01}$ does not exceed $e_{d2}$, the CVT ratio stays at the value $G_n$. There is no hinting.

From the preceding description on FIG. 23, it will be understood that the width d of dead zone should exceed the minimum interval $\Delta G$ for prevention of hunting. In practical application, however, an error inherently occur during operation at the measure CVT ratio generator 340 (see FIG.

4) and noise that remains after filtering at the filter 348 must be taken into account. Minimum magnitude of such noises needs to be added to the minimum interval in CVT ratio that can be attained by the stepper motor 188 in determining the width of dead zone.

Figure 24A:
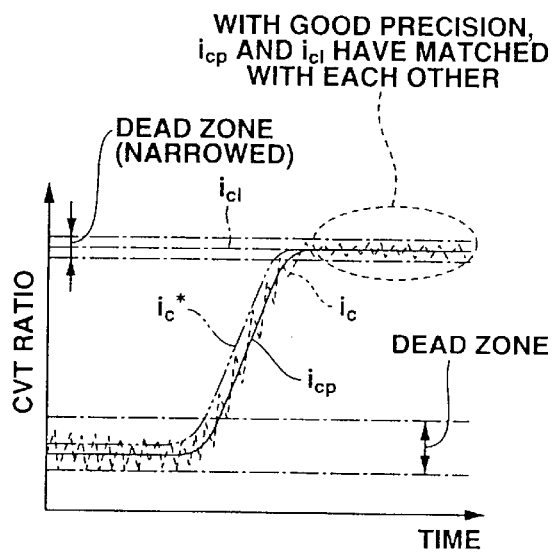
FIGS. 24A, 24B and 24C are simulation results showing the effectiveness of an embodiment according to the present invention as compared to two comparative examples.
Figure 24B:
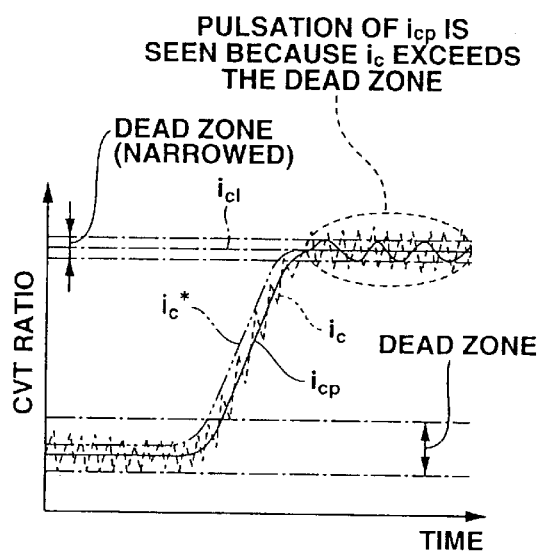
Figure 24C:
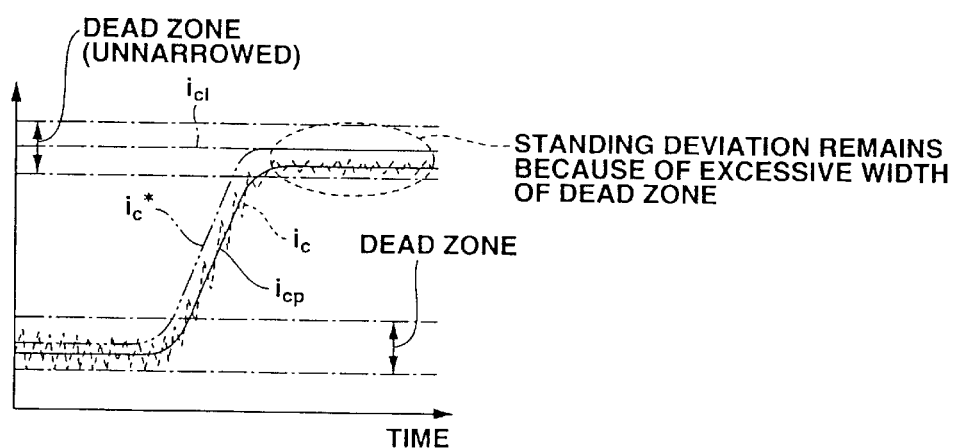

The simulation results of FIGS. 24A, 24B and 24C clearly tell that the embodiments of the present invention provide enhanced CVT ratio control in attaining a precision required value $i_{cI}$ of CVT ratio with excellent precision without hunting and standing deviation.

With reference to FIG. 24A, upon determination that a desired value of CVT ratio had been accomplished after the desired value of CVT ratio had matched with the precision required value $i_{cI}$ of CVT ratio, dead zone was narrowed and filter gains were lowered. This simulation result clearly shows the effectiveness of the embodiments of the present invention.

With reference to FIG. 24B, upon determination that a desired value of CVT ratio had been accomplished after the desired value of CVT ratio had matched with the precision required value $i_{cI}$ of CVT ratio, dead zone was narrowed without lowering filter gains. This simulation result clearly shows the occurrence of hunting.

With reference to FIG. 24C, upon determination that a desired value of CVT ratio had been accomplished after the desired value of CVT ratio had matched with the precision required value $i_{cI}$ of CVT ratio, without narrowing dead zone, filter gains were lowered. This simulation result clearly shows the occurrence of standing deviation.

Figure 25:
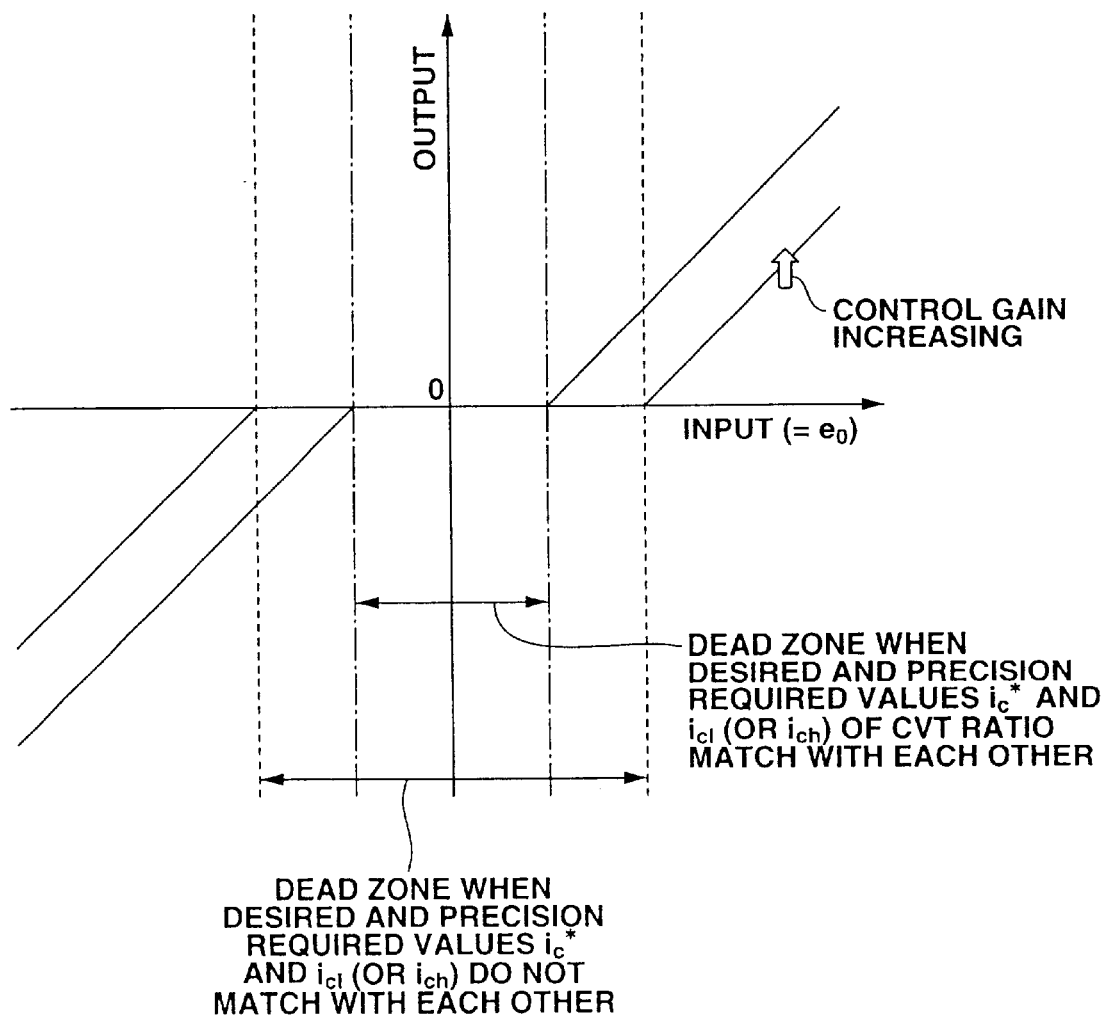
FIG. 25 is graphical representation showing the relationship between control gain and dead zone.
Figure 26A:
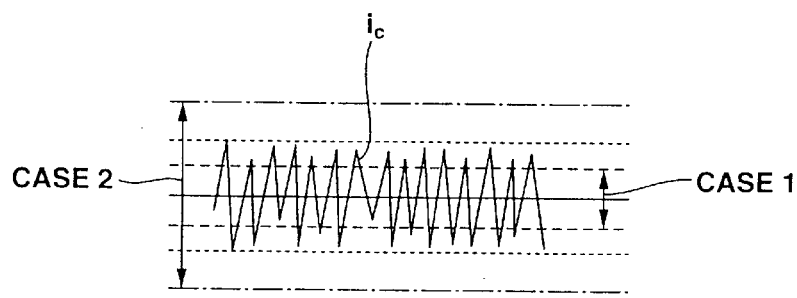
FIGS. 26A, 26B and 26C illustrate two excessive cases in setting dead zone.
Figure 26B:
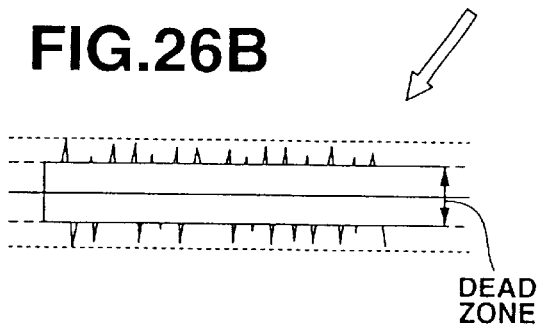
Figure 26C:
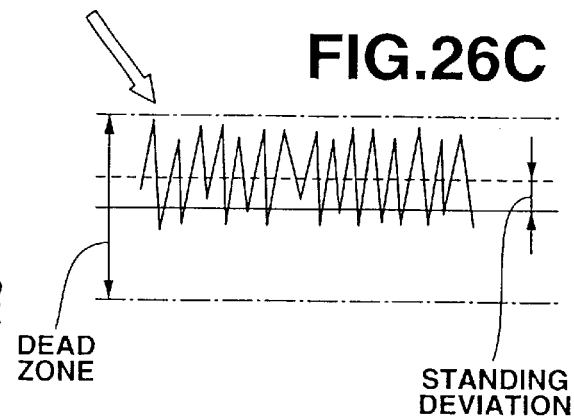

FIG. 25 clearly shows the relationship between control gain and dead zone. It will be understood that if dead zone is narrowed, the control gain is applied to deviation between estimated value $i_c$ and desired value $i_c^*$ over range of smaller values, so that the precision required value of CVT ratio can be attained with excellent precision while suppressing vibrations.

While the present invention has been particularly described, in conjunction with exemplary embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Application No. P2001-369913, filed Dec. 4, 2001, the disclosure of which is hereby incorporated by reference in its entirety.

What is claimed is:

1. A system for enhanced ratio control in a continuously variable transmission (CVT) including a ratio control element positionable by an actuator in response to an actuator command to establish various CVT ratios in the CVT, the system comprising:
   a measured CVT ratio generator obtaining information of an actual CVT ratio established in the CVT to give a measured value of CVT ratio;
   a filter processing the measured value of CVT ratio in a manner to refine the information of the actual CVT ratio to give an estimated value of CVT ratio;
   a command generator determining the actuator command such that the actuator command remains unaltered when a deviation of the estimated value of CVT ratio from a desired value of CVT ratio stays within a dead zone; and
   a filter and command generator manager narrowing the dead zone to meet precision requirement upon determination that the desired value of CVT ratio has been accomplished and adjusting the filter to gain requirement for keeping the magnitude of signal at frequency of noise within the narrowed dead zone.

2. The system as claimed in claim 1, further comprising:
   a noise estimator determining amplitude and frequency of noise contained in the measured value of CVT ratio, and
   wherein the filter and command generator manager determines the filter gain based on the estimated amplitude at the estimated frequency of noise and the dead zone.

3. The system as claimed in claim 2, further comprising a desired CVT ratio generator generating the desired value of CVT ratio in response to a vehicle speed indicative of speed of rotation of an output member of the CVT and operator torque demand.

4. The system as claimed in claim 3, wherein, upon determination that the desired value of CVT ratio has been accomplished when the precision requirement is present, the filter and command generator manager provides the narrowed dead zone, which is narrower than dead zone provided upon determination that the desired value of CVT ratio has been accomplished when the precision requirement is absent.

5. The system as claimed in claim 4, wherein the filter and command generator manager determines the filter gain so as to suppress the amplitude of noise below a value resulting from subtracting from the width of the narrowed dead zone a sum of minimum interval in CVT ratio that can be attained by the actuator and minimum interval in CVT ratio that can be measured by the measured CVT ratio generator.

6. The system as claimed in claim 4, wherein the dead zone is greater in width than a sum of minimum interval in CVT ratio that can be attained by the actuator, minimum interval in CVT ratio that can be measured by the measured CVT ratio generator, and minimum amplitude of noise.

7. The system as claimed in claim 4, wherein the narrower the dead zone, the lower the gain at frequency of noise.

8. The system as claimed in claim 4,
   wherein the at least one sensor includes an input speed sensor generating a first train of pulses indicative of speed of rotation of an input member of the CVT and an output speed sensor generating a second train of pulses indicative of speed of rotation of an output member of the CVT;
   wherein the filter includes a low pass filter;
   wherein the measured CVT ratio generator gives, as the measured value of CVT ratio, a ratio between speed of rotation of the input member and speed of rotation of the output member, which speeds are determined based on frequency of the first train of pluses and frequency of the second train of pulses, respectively;
   and wherein the filter gain at frequency of noise is lower during operation with CVT ratios used at low speeds of rotation of the output member than it is during operation with CVT ratios used at high speeds of rotation of the output member.

9. The system as claimed in claim 4,
   wherein the at least one sensor includes an input speed sensor generating a first train of pulses indicative of speed of rotation of an input member of the CVT and an output speed sensor generating a second train of pulses indicative of speed of rotation of an output member of the CVT;
   wherein the filter includes a band reject filter;
   wherein the measured CVT ratio generator gives, as the measured value of CVT ratio, a ratio between speed of rotation of the input member and speed of rotation of the output member, which speeds are determined based on frequency of the first train of pluses and frequency of the second train of pulses, respectively; and wherein the lower the speed of rotation of one of the input and output members of the CVT, the lower the frequency to be cut off at the band reject filter.

10. The system as claimed in claim 4, wherein the precision requirement is present when the desired value of CVT ratio has accomplished one of the largest CVT ratio and the smallest CVT ratio.

11. The system as claimed in claim 4, wherein the CVT is an infinitely variable transmission (IVT) having a geared neutral point (GNP), and wherein there is the requirement for precision in holding a predetermined value of CVT ratio needed accomplish the GNP.

12. The system as claimed in claim 4, wherein the filter includes an observer that receives, as inputs, the actuator command as well as the measured value of CVT ratio to provide the estimated value of CVT ratio.

13. The system as claimed in claim 1, wherein the filter and command generator manager increases control gain used in determining the actuator command at the command generator after narrowing the dead zone.

14. A method for enhanced ratio control in a continuously variable transmission (CVT) including a ratio control element positionable by an actuator in response to an actuator command to establish various CVT ratios in the CVT, the method comprising:

obtaining information of an actual CVT ratio established in the CVT to give a measured value of CVT ratio;

processing the measured value of CVT ratio in a manner to refine the information of the actual CVT ratio to give an estimated value of CVT ratio;

determining the actuator command such that the actuator command remains unaltered when a deviation of the estimated value of CVT ratio from a desired value of CVT ratio stays within a dead zone; and narrowing the dead zone to meet precision requirement upon determination that the desired value of CVT ratio has been accomplished and adjusting the filter to gain requirement for keeping the magnitude of signal at frequency of noise within the narrowed dead zone.

15. The method as claimed in claim 14, further comprising determining amplitude and frequency of noise that may be contained in the measured value of CVT ratio, and wherein the processing the measured value of CVT ratio includes determining filter gain based on the amplitude at the frequency of noise and the dead zone.

16. The method as claimed in claim 15, wherein the precision requirement is present when the desired value of CVT ratio matches with a precision required value of CVT ratio.

17. The method as claimed in claim 16, wherein the precision requirement is absent when the desired value of CVT ratio fails to match with the precision required value of CVT ratio.

18. The method as claimed in claim 17, wherein the precision required value of CVT ratio is the largest CVT ratio.

19. The method as claimed in claim 18, wherein the precision required value of CVT ratio is the smallest CVT ratio.

20. The method as claimed in claim 17, wherein the narrowed dead zone is provided upon determination that the desired value of CVT ratio has been accomplished when the desired value of CVT ratio and the precision required value of CVT ratio match with each other, and the narrowed dead zone is narrower than dead zone provided upon determination that the desired value of CVT ratio has been accomplished when the desired value of CVT ratio and the precision required value of CVT ratio fail to match with each other.

21. A system for enhanced ratio control in a continuously variable transmission (CVT) including a ratio control element positionable by an actuator in response to an actuator command to establish various CVT ratios in the CVT, the system comprising:

sensor means for generating a train of pulses indicative of speed of rotation of a predetermined rotary member of the CVT;

means for deriving information of an actual CVT ratio established in the CVT out of at least the train of pulses to give a measured value of CVT ratio;

filter means for processing the measured value of CVT ratio in a manner to refine the information of the actual CVT ratio to give an estimated value of CVT ratio;

means for determining the actuator command such that the actuator command remains unaltered when a deviation of the estimated value of CVT ratio from a desired value of CVT ratio stays within a dead zone;

means for narrowing the dead zone to meet precision requirement upon determination that the desired value of CVT ratio has been accomplished; and adjusting filter gain at the filter means in a manner to keep amplitude at frequency of noise within the narrowed dead zone.

22. A computer readable storage medium having stored thereon data indicative of instructions readable by a microprocessor for carrying out enhanced ratio control in a continuously variable transmission (CVT), the CVT including a ratio control element positionable by an actuator in response to an actuator command to establish various CVT ratios in the CVT, the computer readable storage medium comprising:

instructions for obtaining information of an actual CVT ratio established in the CVT to give a measured value of CVT ratio;

instructions for processing the measured value of CVT ratio in a manner to refine the information of the actual CVT ratio to give an estimated value of CVT ratio;

instructions for determining the actuator command such that the actuator command remains unaltered when a deviation of the estimated value of CVT ratio from a desired value of CVT ratio stays within a dead zone; and instructions for narrowing the dead zone to meet precision requirement upon determination that the desired value of CVT ratio has been accomplished and adjusting the filter to gain requirement for keeping the magnitude of signal at frequency of noise within the narrowed dead zone.

* * * * *